United States Patent
Fujii et al.

(10) Patent No.: US 12,555,423 B2
(45) Date of Patent: Feb. 17, 2026

(54) LOCK MANAGEMENT SYSTEM AND READING AND WRITING APPARATUS

(71) Applicant: CANON KABUSHIKI KAISHA, Tokyo (JP)

(72) Inventors: Kenichi Fujii, Shizuoka (JP); Yuki Nakajima, Kanagawa (JP); Mitsuhide Murofushi, Shizuoka (JP); Yasuhiro Tomioka, Shizuoka (JP); Tomoya Uehara, Shizuoka (JP); Kenichi Nakao, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 18/498,911

(22) Filed: Oct. 31, 2023

(65) Prior Publication Data

US 2024/0062597 A1    Feb. 22, 2024

Related U.S. Application Data

(63) Continuation of application No. PCT/JP2022/019998, filed on May 11, 2022.

(30) Foreign Application Priority Data

May 13, 2021   (JP) .................... 2021-081836

(51) Int. Cl.
   *G07C 9/00*    (2020.01)
(52) U.S. Cl.
   CPC ........... *G07C 9/00174* (2013.01); *G07C 2009/00769* (2013.01)
(58) Field of Classification Search
   CPC ...... G07C 9/00174; G07C 2009/00769; G07C 2009/00793; G07C 9/28; G07C 9/00309; E05B 49/00; G06Q 10/00; G06F 7/00

(Continued)

(56) References Cited

U.S. PATENT DOCUMENTS

| | | | | |
|---|---|---|---|---|
| 7,196,610 B2* | 3/2007 | Straumann | ............... | G07C 9/27 340/5.1 |
| 7,606,558 B2* | 10/2009 | Despain | .............. | H04W 12/082 455/410 |

(Continued)

FOREIGN PATENT DOCUMENTS

| JP | H01-151673 A | 6/1989 |
|---|---|---|
| JP | H04-327666 A | 11/1992 |

(Continued)

OTHER PUBLICATIONS

International Search Report issued Jul. 19, 2022, in corresponding PCT Application No. PCT/JP2022/019998 (English translation included).

(Continued)

*Primary Examiner* — Nam V Nguyen
(74) *Attorney, Agent, or Firm* — VENABLE LLP

(57) ABSTRACT

A lock management system includes: a switching apparatus capable of switching a state of a lock target between a locked state and an unlocked state; a writing apparatus configured to write authentication information in a first storage area of a first RFID tag based on utilization schedule information related to the lock target; and a reading apparatus connected to the switching apparatus, and configured to read the authentication information sent back from the first RFID tag utilizing energy of an emitted electromagnetic wave, and to cause the switching apparatus to switch a state of the lock target in a case where authentication based on the read authentication information is successful.

21 Claims, 20 Drawing Sheets

(58) Field of Classification Search
USPC .................. 340/5.2, 5.5, 5.74, 5.64, 5.6
See application file for complete search history.

(56) References Cited

U.S. PATENT DOCUMENTS

| | | | |
|---|---|---|---|
| 7,885,997 B2 | 2/2011 | Fujii | |
| 8,384,548 B2* | 2/2013 | Knopf | E04G 21/32 |
| | | | 340/5.1 |
| 8,411,592 B2 | 4/2013 | Fujii | |
| 8,466,773 B2* | 6/2013 | Willgert | G06F 21/35 |
| | | | 340/425.1 |
| 8,654,679 B2 | 2/2014 | Fujii | |
| 8,693,373 B2 | 4/2014 | Fujii | |
| 8,792,391 B2 | 7/2014 | Fujii | |
| 8,830,703 B2 | 9/2014 | Murofushi | |
| 9,301,142 B2 | 3/2016 | Fujii | |
| 9,501,046 B2* | 11/2016 | Kalous | G07C 9/00309 |
| 9,985,950 B2* | 5/2018 | Caterino | G06F 21/00 |
| 10,026,250 B2* | 7/2018 | Fisher | G07C 9/00309 |
| 10,277,764 B2 | 4/2019 | Kobayash | |
| 10,783,731 B2* | 9/2020 | Imanuel | G07C 9/28 |
| 10,944,327 B2 | 3/2021 | Murofushi | |
| 10,977,583 B2* | 4/2021 | Camargo | G07C 9/00571 |
| 10,991,240 B2* | 4/2021 | Davis | G06F 1/3287 |
| 11,348,391 B2* | 5/2022 | Fisher | H04W 4/80 |
| 11,388,595 B2* | 7/2022 | Everson | H04L 9/3242 |
| 11,423,723 B2* | 8/2022 | Davis | G07C 9/00309 |
| 12,159,497 B2* | 12/2024 | Kuenzi | G06F 21/45 |
| 2002/0180582 A1* | 12/2002 | Nielsen | G07C 9/21 |
| | | | 340/5.6 |
| 2019/0327098 A1* | 10/2019 | Hart | E05B 45/06 |
| 2022/0012183 A1 | 1/2022 | Karve et al. | |
| 2022/0084338 A1* | 3/2022 | Mitris | G07C 9/21 |

FOREIGN PATENT DOCUMENTS

| | | |
|---|---|---|
| JP | H06-264661 A | 9/1994 |
| JP | H09-245138 A | 9/1997 |
| JP | H11-232514 A | 8/1999 |
| JP | 2011-221907 A | 11/2011 |

OTHER PUBLICATIONS

U.S. Appl. No. 18/514,214, filed Nov. 20, 2023 by Tomoya Uehara.
Japanese Office Action issued Jul. 14, 2025 during prosecution of Japanese application No. 2021-081836 (English language machine translation included).

* cited by examiner

F I G. 3

| Memory Bank | | R | W |
|---|---|---|---|
| Bank 11 | USER | Yes | Yes |
| Bank 10 | TID | Yes | No |
| Bank 01 | EPC (UII) | Yes | Yes |
| Bank 00 | RESERVED | No | No |

F I G. 5
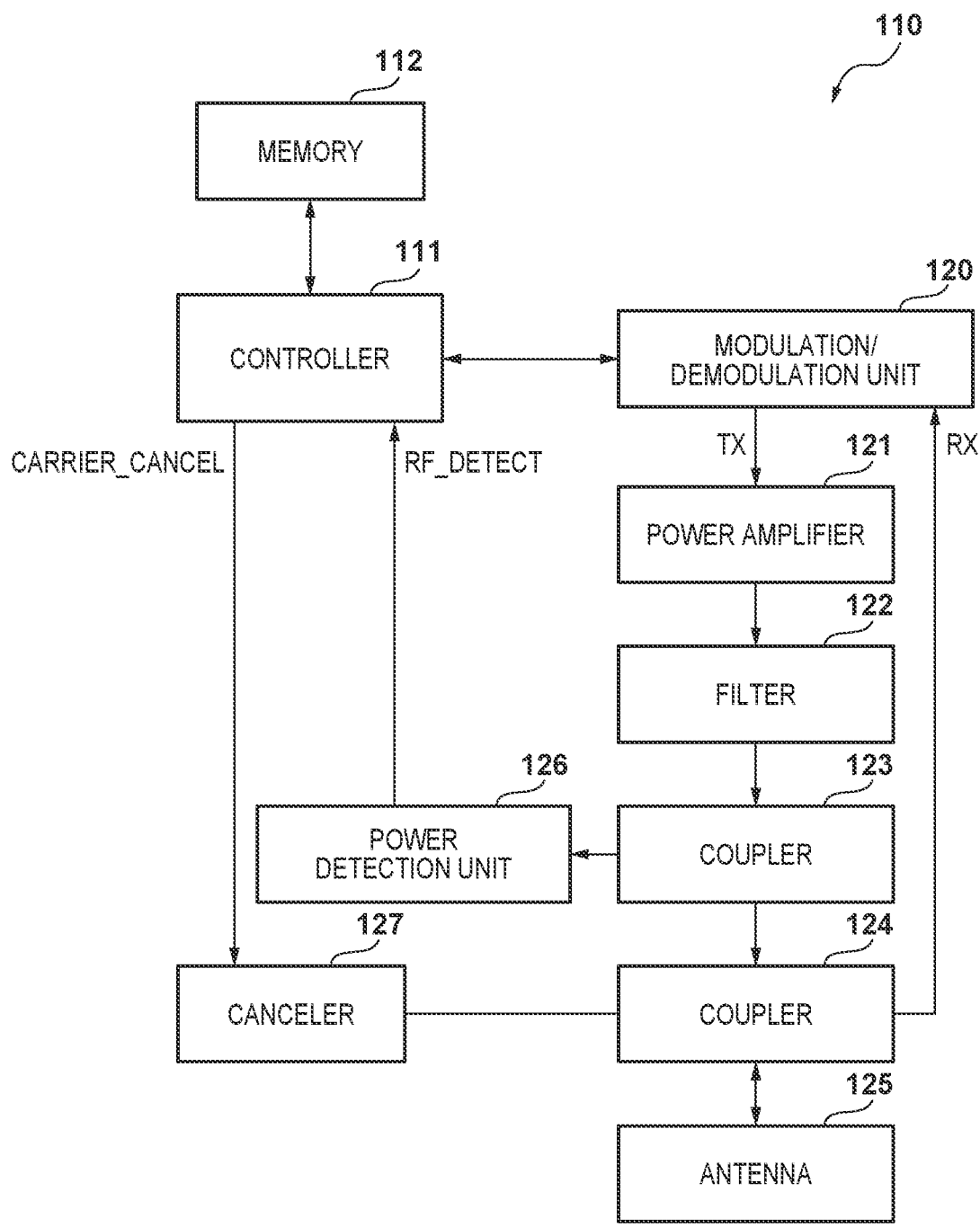

LOCK MANAGEMENT SYSTEM AND READING AND WRITING APPARATUS

CROSS-REFERENCE TO RELATED APPLICATIONS

This application is a Continuation of International Patent Application No. PCT/JP2022/019998, filed May 11, 2022, which claims the benefit of Japanese Patent Application No. 2021-081836, filed May 13, 2021, both of which are hereby incorporated by reference herein in their entirety.

BACKGROUND OF THE INVENTION

Field of the Invention

The present disclosure relates to a lock management system and a reading and writing apparatus.

Background Art

Radio frequency identification (RFID) is a technology that allows information embedded in a small device which is also referred to as a tag to be read by an external reader through short-range wireless communication. Among others, a passive type RFID tag, which transmits information utilizing energy of electromagnetic wave emitted from a reader, does not require a battery and thus is low-cost in manufacturing, and can operate semi-permanently. Hence, it has become widely-used in various scenes.

For example, PTL 1 discloses a system in which a personal ID is stored in an RFID tag embedded in a name card worn by a user and whether to allow the user to activate a function of a terminal apparatus is determined based on the ID read from the RFID tag by a reader of the terminal apparatus. PTL 2 discloses that, in an entry/exit management system which unlocks an electric lock in a case where authentication is successful, an RFID tag is used as a medium for storing data for authentication. PTL 2 also discloses that, in the entry/exit management system, the costs required for history management can be reduced by analyzing the number of entries in the electric lock operation history.

As with the techniques disclosed in PTLs 1 and 2, by reading authentication information for determining whether to allow a function to be activated or an electric lock to be unlocked from an RFID tag embedded in an item carried by a user, there is no need to request the user to perform a complicated operation at the time of authentication.

CITATION LIST

Patent Literature

PTL 1: Japanese Patent Laid-Open No. H09-245138
PTL 2: Japanese Patent Laid-Open No. 2011-221907

However, with the system disclosed in PTL 1, which function to allow to be activated is defined per personal ID. Thus, a user granted the privilege to utilize a certain function can utilize the function at any time. In the system disclosed in PTL 2 also, a user carrying a medium storing valid authentication data for a room is always allowed to enter the room. Therefore, neither system is suited to an application to impose a time-based restriction on utilization of a managed target.

The present invention has been made in consideration of the aforementioned situation and aims at realizing a mechanism that can impose a time-based restriction on utilization of a target without requesting a user to perform a complicated operation.

SUMMARY OF THE INVENTION

According to an aspect, there is provided a lock management system including: a switching apparatus capable of switching a state of a lock target between a locked state and an unlocked state; a first RFID tag having a rewritable first storage area; a writing apparatus capable of writing information in an RFID tag and configured to write authentication information in the first storage area of the first RFID tag based on utilization schedule information related to the lock target; and a reading apparatus connected to the switching apparatus and capable of reading information from an RFID tag, wherein the reading apparatus is configured to read the authentication information sent back from the first RFID tag utilizing energy of an electromagnetic wave emitted by the reading apparatus, and to cause the switching apparatus to switch a state of the lock target in a case where authentication based on the read authentication information is successful. A corresponding reading and writing apparatus is also provided.

According to another aspect, there is provided a lock management system including: a switching apparatus capable of switching a state of a lock target between a locked state and an unlocked state; a first RFID tag having a rewritable first storage area; a writing apparatus capable of writing information in an RFID tag and configured to write, in the first storage area of the first RFID tag, term information related to a term when a user is scheduled to utilize the lock target; and a reading apparatus connected to the switching apparatus and capable of reading information from an RFID tag, wherein the reading apparatus is configured to read the term information sent back from the first RFID tag utilizing energy of an electromagnetic wave emitted by the reading apparatus, and to cause the switching apparatus to switch a state of the lock target so as to allow the user to utilize the lock target during a term indicated by the read term information.

Further features of the present invention will become apparent from the following description of exemplary embodiments with reference to the attached drawings.

BRIEF DESCRIPTION OF THE DRAWINGS

FIG. 3 is an explanatory diagram for describing an example of a memory structure of an RFID tag.

FIG. 5 is a block diagram illustrating an example of a detailed configuration of a reading and writing unit of the reader/writer of FIG. 4.

DESCRIPTION OF THE EMBODIMENTS

Figure 1:
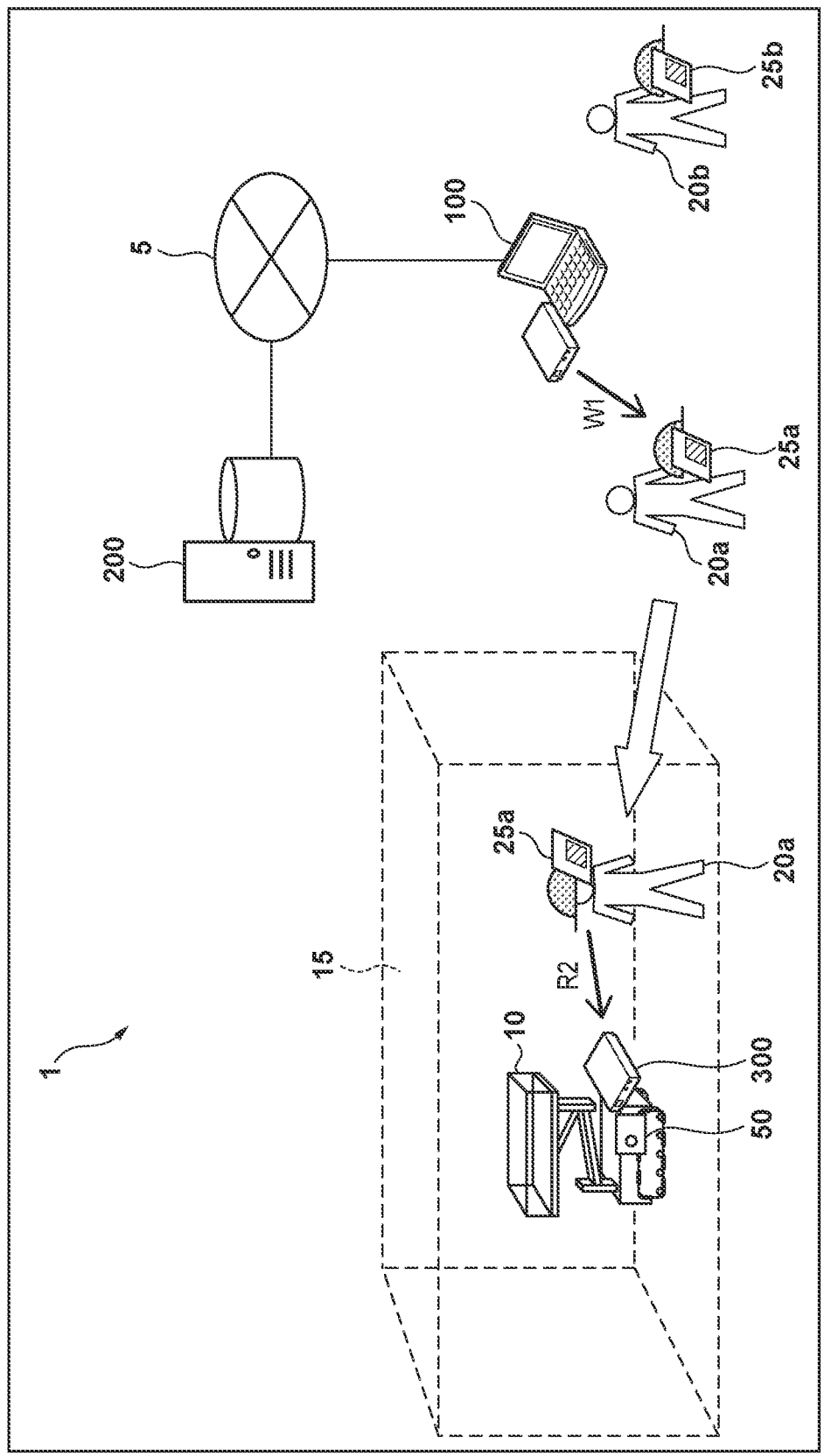
FIG. 1 is a schematic diagram illustrating an overview of a lock management system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

1. FIRST EMBODIMENT 1-1. System Overview

FIG. 1 is a schematic diagram illustrating an overview of a lock management system 1 according to the first embodiment. The lock management system 1 is a system for managing states of one or more lock targets existing in a real space through authentication based on information written in RFID tags.

In the present specification, a lock target refers to an object utilized by a user, with the utilization having a time-based restriction imposed on it. In the present specification, the state of a lock target with a restriction imposed on utilization is referred to as a "locked state", and the state of a lock target with no restriction imposed is referred to as an "unlocked state". Also, imposing a restriction on the utilization of a lock target is referred to as "lock/locking", and removing such a restriction is referred to as "unlock/unlocking".

In an example, a lock target may be an item or a space, and an electronic lock capable of switching the state of a lock target between the locked state and the unlocked state may be used. For example, the electronic lock may be attached to the item itself, to a safe storing the item, or to a gate or door provided on the item or on an access path to a space. In this case, locking the lock target may include locking the electronic lock to restrict the utilization of the lock target, and unlocking the lock target may include unlocking the electronic lock to allow utilization of the lock target.

In another example, the lock target may be a function specific to equipment, and the equipment itself may be capable of switching the state of the lock target between the locked state and the unlocked state via the function of a piece of software or hardware. In this case, locking the lock target may include the equipment preventing the function from being activated, and unlocking the lock target may include the equipment stopping the prevention to allow the function to be activated.

In the example in FIG. 1, a lock target 10 is a mobile elevating work platform, which is a type of industrial machinery or construction machinery. Generally, industrial machinery or construction machinery has functions specifically suited to its purpose. For example, the functions of a mobile elevating work platform include a function of raising and lowering a work platform carrying a worker and a function of self-propulsion. If such equipment (not only including mechanical devices but also simpler instruments) is utilized at a point in time outside of the scheduled work plan, it may cause a risk of management or safety problems. Thus, an operating policy is often adopted which restricts utilization of the equipment during normal times and allow the utilization by a specific user at a point in time or in a term permitted in accordance with a plan.

According to known methods, a physical lock such as a cylinder lock is installed in a safe storing equipment or a control panel for operating equipment, for example. Then, a key used for locking and unlocking the lock is centrally managed at a management office or similar location. Valid users borrow the key from the management office to utilize the equipment. However, such a method results in many inconveniences including not only imposing upon a user a complicated task of locking and unlocking a lock using a key, but also incurring costs to set up measures against the lost or theft of the physical key, as well as burdening human resources relating to management, and so on.

Figure 2:
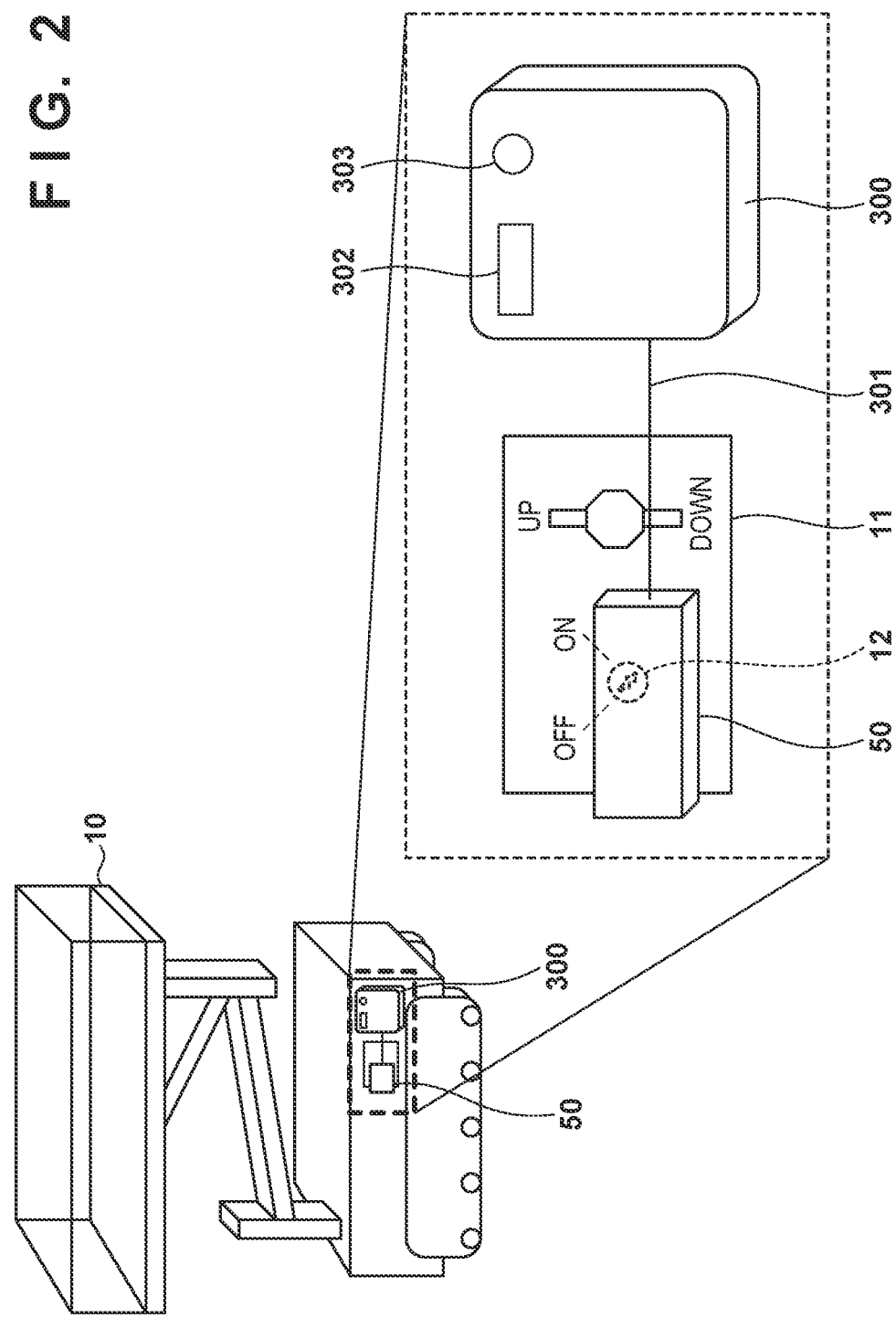
FIG. 2 is an enlarged schematic diagram illustrating how a switching apparatus and a tag reader are attached to a lock target in the lock management system of FIG. 1.

In the present embodiment, in order to resolve or at least mitigate the inconveniences described above, a switching apparatus 50 and a tag reader 300 connected to the switching apparatus 50 are introduced. The switching apparatus 50 and the tag reader 300 are attached to the lock target 10. FIG. 2 is an enlarged diagram illustrating how the switching apparatus 50 and the tag reader 300 are attached to the lock target 10.

As illustrated in FIG. 2, a control panel 11 is provided on the vehicle body portion of the lock target 10, and the control panel 11 includes a keyhole 12. When the key is inserted into the keyhole 12 and turned clockwise, the raising and lowering function of the lock target 10 and the self-propulsion function are made able to be activated (the lock target 10 is put in the unlocked state), and when the key is turned anticlockwise, activation of these functions is prevented (the lock target 10 is put in the locked state). In the example in FIG. 2, the switching apparatus 50 is attached covering the keyhole 12. The switching apparatus 50 is an electronic lock. The switching apparatus 50 includes an actuator capable of rotating a physical key (not illustrated) inserted into the keyhole 12. The tag reader 300 is connected to the switching apparatus 50 via a connection line 301. The tag reader 300 may include a button 302 and a light 303. The switching apparatus 50, in accordance with a command received from the tag reader 300 via the connection line 301, activates the actuator and causes it to rotate the key to lock or unlock the lock target 10. An example of a more detailed configuration of the switching apparatus 50 and the tag reader 300 will be described below. Note that the connection between the switching apparatus 50 and the tag reader 300 may be a wired connection via the connection line 301 as in the example in FIG. 2 or may be a wireless connection.

Returning to FIG. 1, the lock management system 1 includes, in addition to the switching apparatus 50 and the tag reader 300, a reader/writer 100 and a management server 200.

The reader/writer 100 is a reading and writing apparatus capable of writing information in an RFID tag 25 carried or worn by a user 20 and capable of reading information from the RFID tag 25. In the example in FIG. 1, a user 20a is carrying a helmet equipped with an RFID tag 25a, and a user 20b is carrying a helmet equipped with an RFID tag 25b. Note that in the present specification, when there is no need to discriminate between the users 20a, 20b, and so on, user 20 will be used as a collective term, omitting the alphabet letter at the end of the reference number. This also applies for the RFID tags 25a, 25b, and so on (RFID tag 25) and other components.

The reader/writer 100 is connected to the management server 200 via a network 5. The network 5 may be a wired network, a wireless network, or a discretionary combination thereof. Examples of the network 5 include the Internet, an intranet, and a cloud network. The reader/writer 100, as described below in detail, obtains utilization schedule information related to the lock target 10 from the management server 200 and writes authentication information in a rewritable storage area of the RFID tag 25 based on the obtained utilization schedule information (arrow W1 in the diagram).

The RFID tag 25 is a type of wireless device and is specifically a passive RFID tag (passive tag). The passive tag is constituted by a small Integrated Circuit (IC) with built-in memory and an antenna and stores identification information for identifying the tag and other information in the memory. In the present specification, the identification information is also simply referred to as ID, and the identification information for identifying a tag is also simply referred to as tag ID. The IC chip of the passive tag operates utilizing the energy of an electromagnetic wave emitted from the reader or the writer. Then, in a case where a read command is modulated in the emitted electromagnetic wave, the IC chip modulates the information stored in the memory into an information signal and transmits (sends back) the information signal from the antenna. Also, when a write command is modulated in the emitted electromagnetic wave, the IC chip demodulates a received signal following the write command to obtain information to write it in the memory, and transmits (sends back) a response indicating success or failure of the operation from the antenna.

The RFID tag 25, for example, has a memory structure compliant with the EPC Class 1 Generation 2 (EPC GEN2) standard specification established by EPCglobal, a subsidiary of GS1. FIG. 3 is a schematic diagram of the memory structure specified by EPC GEN2. The illustrated memory structure includes the following four storage areas:

Memory bank "00" reserved area (RESERVED),
Memory bank "01" EPC area (EPC),
Memory bank "10" chip information area (TID), and
Memory bank "11" user area (USER).

In the reserved area, control data for controlling memory access is prewritten, and the reading and writing of data from the outside are both not possible (R="No", W="No"). In the EPC area, tag ID for uniquely identifying each RFID tag is written. The tag ID may have a format in which the GS1 company code is concatenated with an item code and serial number defined by the company to make each RFID uniquely identifiable. The reading and writing of data to the EPC area are both possible (R="Yes", W="Yes"). The chip maker can make it possible for data to be written to the EPC area only once. In the chip information area, a model number, serial number, and chip settings information set by the chip maker are written. Reading data from the chip information area is possible, but writing is not possible (R="Yes", W="No"). In the user area, information freely set by each company introducing RFID tags into a system is written. The reading and writing of data to the user area are both possible (R="Yes", W="Yes"). In the lock management system 1, the reader/writer 100 is capable of writing authentication information to the user area of the RFID tag 25, for example.

The management server 200 is an information processing apparatus that uses a database to manage utilization schedule information indicating a schedule of when what users can utilize the lock target. The management server 200, for example, may be implemented as an application server, a database server, or a cloud server using a high performance general-purpose computer. In FIG. 1, only one lock target 10 is illustrated, but the management server 200 may manage the utilization schedule information for more lock targets. Also, in FIG. 1, only two users 20a and 20b are illustrated, but the number of users with a possibility of utilizing each lock target is not limited by this example and may be any number. An example of a more detailed configuration of the management server 200 will be described below.

In the example in FIG. 1, the management server 200 is a cloud server installed in a cloud environment. In FIG. 1, a solitary management server 200 is illustrated, but the functions of the management server 200 may be provided via a solitary apparatus or provided by a plurality of physically distinct apparatuses cooperating with one another. Also, in the example described in the present embodiment, the management server 200 maintains the database that stores the utilization schedule information. However, an apparatus other than the management server 200 may maintain a portion or all of the database. For example, some data may be maintained by the reader/writer 100.

The tag reader 300 is a reading apparatus capable of reading information from the RFID tags 25. The tag reader 300 reads, from an RFID tag 25 (arrow R2 in the diagram), authentication information written in the RFID tag 25 by the reader/writer 100. Also, the tag reader 300 attempts authentication based on the read authentication information and, in a case where the authentication is successful, causes the switching apparatus 50 to switch the state of the lock target 10. Take an example in which the user 20*a* wears a helmet equipped with the RFID tag 25*a* in which valid authentication information is written and approaches the tag reader 300 in order to utilize the lock target 10. When this occurs, the tag reader 300 reads the authentication information from the RFID tag 25*a*, attempts authentication, and transmits an unlock command to the switching apparatus 50 in response to successful authentication. In response to the unlock command received from the tag reader 300, the switching apparatus 50 rotates the key of the lock target 10 that has been in a locked state to unlock the lock target 10. As a result, the user 20*a* is allowed to utilize the functions of the lock target 10.

In the example in FIG. 1, the lock target 10 is kept in a site 15. The site 15 is a construction work site. In a case where the site 15 is a location where electromagnetic waves from a base station have trouble reaching, such as inside a tunnel, indoors, or at sea, the switching apparatus 50 and the tag reader 300 attached to the lock target 10 may be unable to communicate with an external authentication server. However, according to the present embodiment, the tag reader 300 relies only on local communication with the RFID tag 25 to perform authentication, and thus can perform authentication irrespective of what kind of location the site 15 is.

Though not illustrated in FIG. 1, each user 20 may possess a user terminal such as a Personal Computer (PC), smartphone, or mobile phone, for example. The user terminal includes an input device, a processor, a memory, an output device, and a communication interface, for example, and is used to input and transmit the utilization schedule information to be registered in the database.

1-2. Apparatus Configuration Examples

Figure 4:
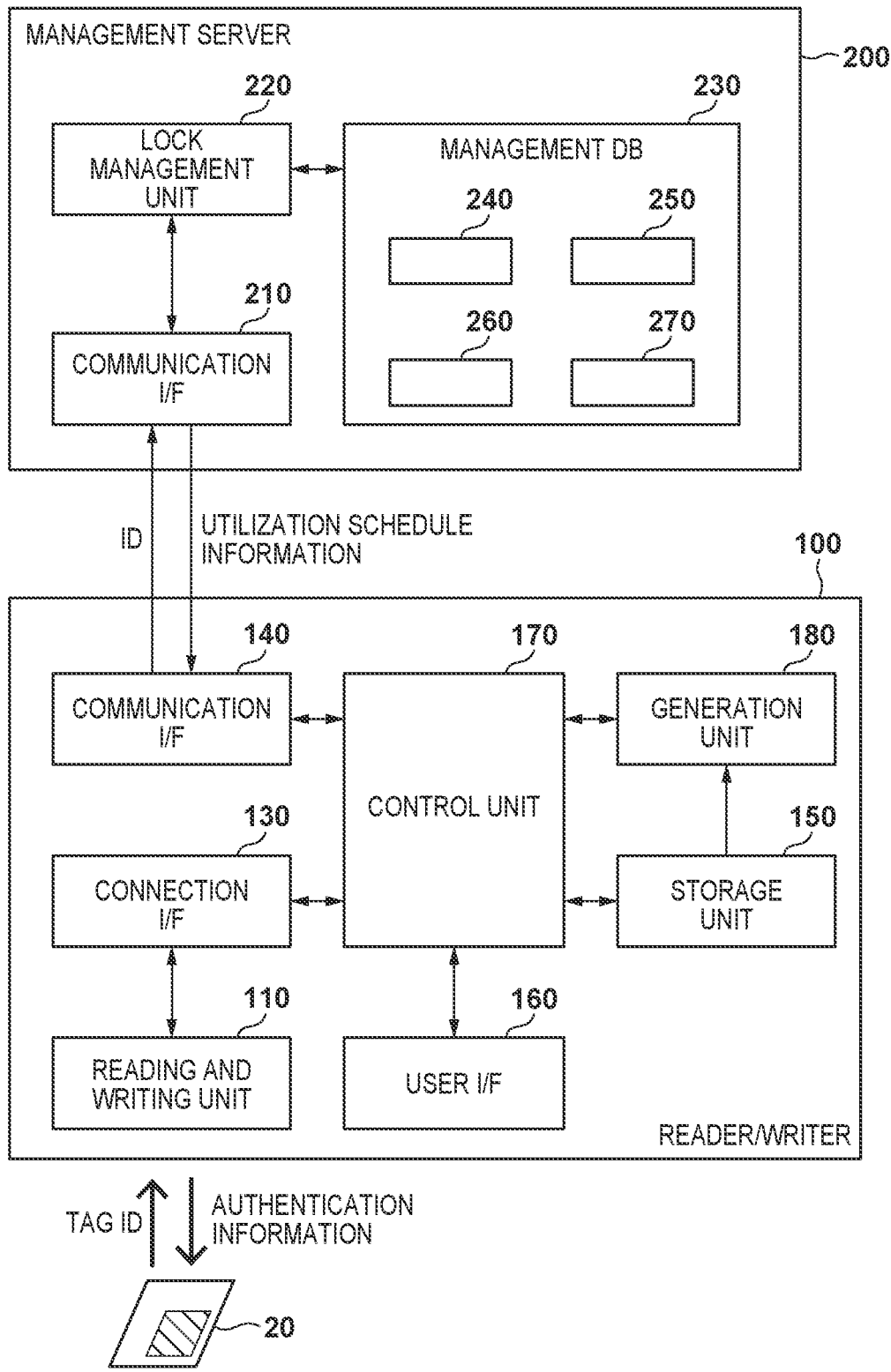
FIG. 4 is a block diagram illustrating an example of configurations of a reader/writer and a management server according to the first embodiment.

Next, examples of more detailed configurations of the apparatuses constituting the lock management system 1 will be described in order using FIGS. 4 to 6.
(1) Reader/Writer FIG. 4 is a block diagram illustrating an example of configurations of the reader/writer 100 and the management server 200 according to the present embodiment. As illustrated in FIG. 4, the reader/writer 100 includes a reading and writing unit 110, a connection interface (I/F) 130, a communication I/F 140, a storage unit 150, a user I/F 160, a control unit 170, and a generation unit 180.

The reading and writing unit 110 performs communication for reading information from RFID tags 25 and writing information in RFID tags 25. FIG. 5 is a diagram illustrating an example of a detailed configuration of the reading and writing unit 110. As illustrated in FIG. 5, the reading and writing unit 110 includes a controller 111, a memory 112, a modulation/demodulation unit 120, a power amplifier 121, a filter 122, a first coupler 123, a second coupler 124, an antenna 125, a power detection unit 126, and a canceler 127.

The controller 111 controls the communication functions of the reading and writing unit 110. For example, the controller 111 periodically causes an electromagnetic wave to be emitted from the antenna 125 within the tag reading range of the reading and writing unit 110 and attempts to read information from an RFID tag 25. When the controller 111 detects a reception signal from an RFID tag 25, the controller 111 outputs the information read from the RFID tag 25 to the control unit 170 via the connection I/F 130. Also, the controller 111, in response to an instruction from the control unit 170, causes a transmission signal with modulated information to be written in an RFID tag 25 to be transmitted from the antenna 125. The memory 112, for example, is a semiconductor memory such as ROM or RAM and temporarily stores information read from an RFID tag 25 and information to be written in an RFID tag 25.

The modulation/demodulation unit 120, in accordance with control by the controller 111, outputs a transmission signal (for example, a signal modulated at the UHF band) from a TX terminal to the power amplifier 121. The power amplifier 121 amplifies a transmission signal input from the modulation/demodulation unit 120 and outputs it to the filter 122. The filter 122 may be a low-pass filter, for example, and removes unnecessary frequency components of the transmission signal after amplification by the power amplifier 121. The first coupler 123 distributes the transmission signal after passing through the filter 122 to the coupler 124 and the power detection unit 126. The second coupler 124 outputs a transmission signal input from the first coupler 123 to the antenna 125 and outputs a reception signal input from the antenna 125 to the modulation/demodulation unit 120. The antenna 125 transmits a transmission signal input from the coupler 124 into the air as an electromagnetic wave. Also, the antenna 125 receives a signal sent back from an RFID tag 25 present in the reading range of the reading and writing unit 110 as a response to a transmission signal and outputs a reception signal to the coupler 124. The power detection unit 126 detects the power level of a signal input from the first coupler 123 and outputs a signal RF DETECT indicating the detected power level to the controller 111. The canceler 127 accepts a signal CARRIER CANCEL indicating a power level of a carrier wave from the controller 111. Also, the canceler 127 may cancel a carrier wave component of a transmission signal based on a CARRIER CANCEL to extract a desired signal component of a reception signal to be output to an RX terminal of the modulation/demodulation unit 120. The modulation/demodulation unit 120 demodulates a signal input from the RX terminal, obtains the information sent back from the RFID tag, and outputs the obtained information to the controller 111.

The connection I/F 130 is an interface for connecting the reading and writing unit 110 to the control unit 170. The connection I/F 130, for example, may be a wired interface such as a Universal Serial Bus (USB) interface or may be a wireless interface such as a Bluetooth (registered trademark) interface. The connection I/F 130 may include a power supply line for supplying power to the reading and writing unit 110.

The communication I/F 140 is an interface for the reader/writer 100 to communicate with the management server 200 and other apparatuses. For example, the communication I/F 140 may be a Wireless Local Area Network (WLAN) interface that communicates with a WLAN access point or may be a cellular communication interface that communicates with a cellular base station.

The storage unit 150 stores one or more computer programs to be executed by the control unit 170 and various information such as the utilization schedule information described below. The storage unit 150, for example, may include any type of storage medium, such as a ROM, a RAM, or a similar type of semiconductor memory, an optical disk, or a magnetic disk.

The user I/F 160 is an interface for the reader/writer 100 to accept information input from a user and present information to the user. The user I/F 160 may include an input device including one or more of a touch panel, a key pad, a keyboard, and a microphone and an output device including one or more of a display, an LED, and a speaker, for example.

The control unit 170 controls all of the functions of the reader/writer 100 described in the present specification. For example, the control unit 170 causes the reading and writing unit 110 to read a tag ID from an RFID tag detected in the tag reading range of the reader/writer 100. Typically, the tag ID may be read from the EPC area of the memory structure described using FIG. 3. However, the control unit 170 may identify an RFID tag using the information read from the chip information area or the user area in a complementary or alternative manner. In a case where the read tag ID is the ID of the RFID tag 25 under the management of the lock management system 1, the control unit 170 inquires to the management server 200 via a communication interface 140 about whether utilization schedule information related to the detected RFID tag 25 exists.

Take an example in which the user 20a is scheduled to utilize the lock target 10 in a specific time period on a certain day. Utilization schedule information indicating this utilization schedule is registered in the database of the management server 200. Before starting utilization, the user 20a stops at the reader/writer 100, and the reader/writer 100 detects the RFID tag 25a and transmits an inquiry to the management server 200. In response to the inquiry, the management server 200 sends back the related utilization schedule information to the reader/writer 100. The control unit 170 receives the utilization schedule information via the communication interface 140 and causes the generation unit 180 to generate authentication information to be written in the RFID tag 25a. Then, the reading and writing unit 110, under control by the control unit 170, writes the authentication information generated by the generation unit 180 in a rewritable storage area (for example, user area) of the RFID tag 25a.

In a first implementation example according to the present embodiment, the utilization schedule information is associated with tag identification information (tag ID) for identifying the RFID tag 25 carried or worn by the user who utilizes the lock target 10 and registered in the database of the management server 200. The control unit 170 includes the tag ID read from the RFID tag 25 in an inquiry for utilization schedule information and transmits the inquiry to the management server 200. The management server 200 obtains the utilization schedule information associated with the tag ID received from the reader/writer 100 from the database and sends the obtained utilization schedule information to the reader/writer 100. The control unit 170 causes the generation unit 180 to generate authentication information to be written in the RFID tag 25 based on the utilization schedule information obtained from the database in this manner. According to the first implementation example, each user 20 can easily obtain authentication information required for utilizing the lock target 10 during a scheduled term by simply bringing an RFID tag 25 which he or she carries or wears at working time close to the reader/writer 100.

In a second implementation example according to the present embodiment, the utilization schedule information is associated with identification information for identifying a user who utilizes the lock target 10 and registered in the database of the management server 200. For example, each user 20 possesses an IC card (for example, employee ID card) equipped with another RFID tag storing the user ID for identifying himself/herself. This other RFID tag is not illustrated in FIG. 1. The control unit 170 causes the reading and writing unit 110 to read the user ID from the RFID tag of the IC card possessed by the user. The control unit 170 includes the read user ID in an inquiry for utilization schedule information and transmits the inquiry to the management server 200. The management server 200 obtains the utilization schedule information associated with the user ID received from the reader/writer 100 from the database and sends the obtained utilization schedule information to the reader/writer 100. The control unit 170 causes the generation unit 180 to generate authentication information to be written in the RFID tag 25 based on the utilization schedule information obtained from the database in this manner. According to the second implementation example, each user 20 can easily obtain authentication information required for utilizing the lock target 10 in a scheduled term by simply bringing an RFID tag 25 which he or she carries or wears at working time and the other RFID tag for user identification close to the reader/writer 100.

In a third implementation example according to the present embodiment, the utilization schedule information is associated with a user ID for identifying a user who utilizes the lock target 10 and registered in the database of the management server 200. The control unit 170 displays an input screen (for example, a login screen for logging into the system) for inputting the user ID on the display and accepts the user ID (and a login password as necessary) input by the user 20 on the screen. The control unit 170 includes the accepted user ID in an inquiry for utilization schedule information and transmits the inquiry to the management server 200. The management server 200 obtains the utilization schedule information associated with the user ID received from the reader/writer 100 from the database and sends the obtained utilization schedule information to the reader/writer 100. The control unit 170 causes the generation unit 180 to generate authentication information to be written in the RFID tag 25 based on the utilization schedule information obtained from the database in this manner. As in the third implementation example, according to a method for accepting user identification information (user ID) via a user interface, it is possible to give authentication information to valid users based on a typical mechanism of access management without requiring further RFID tags.

In any of the implementation examples, the utilization schedule information provided from the management server 200 to the reader/writer 100 may include an ID (for example, a target ID or reader ID described below) associated with a lock target to be utilized and utilization term information related to the corresponding term. Here, term is predefined in a format of a division of a time axis, such as a.m. or p.m. of each date or a time period with a duration of one hour or a few hours. The utilization term information identifies a term during which a lock target is utilized by a reference time (for example, start time) or another identifier.

The generation unit 180 generates authentication information to be written in the user area of an RFID tag 25 based on authentication base information and utilization term information specific to a lock target identified by the utilization schedule information. The authentication base information is information which serves as a basis for generation of the authentication information. The authentication base information may be different for each of one or more lock targets.

In a first example of a method for generating authentication information, the authentication base information may be utilization target ID for identifying a lock target to be utilized. In this case, the generation unit 180 encodes a bit sequence based on the utilization target ID and the utilization term information in accordance with a predetermined encoding scheme to generate the authentication information. The predetermined encoding scheme may be a scheme for outputting an authentication code corresponding to an arbitrary bit sequence (message) input, such as a hash-based message authentication code (HMAC) scheme, for example. Typically, the length of an authentication code is a constant length shorter than the original bit sequence. Thus, by writing the authentication code in an RFID tag 25 as authentication information, the limited storage area in the RFID tag 25 can be efficiently used. Here, the authentication code may be referred to as a one-time password. The storage unit 150 may prestore a symmetric key (common key) used by the generation unit 180 for encoding. For example, by prestoring a symmetric key shared across the entire system in the storage unit 150, key information does not need to be exchanged between the reader/writer 100 and the management server 200. Alternatively, the symmetric key used by the generation unit 180 may be received from the management server 200 together with the utilization schedule information. As described below, the tag reader 300 prestores (shares) the same symmetric key for the purpose of authentication.

In a variant of the first example described above, the authentication base information may be a symmetric key different for each lock target. In this case, the generation unit 180 can generate an authentication information specific to the lock target to be utilized without including the utilization target ID in the input bit sequence for encoding processing. In other words, the generation unit 180 encodes a bit sequence based on the utilization term information with a symmetric key specific to the lock target to be utilized to generate the authentication information.

In a second example of a method for generating authentication information, the authentication base information may be an encryption key different for each lock target. Here, the encryption key may be a symmetric key or may be an asymmetric key which is different from the key used for decryption. In the second example, the generation unit 180 generates the authentication information by encrypting the utilization term information with the encryption key (first encryption key) specific to the lock target to be utilized. The authentication information in this case corresponds to encrypted utilization term information. The storage unit 150 may prestore the first encryption key. Alternatively, the first encryption key may be received from the management server 200 together with the utilization schedule information. As described below, the tag reader 300 prestores a second encryption key (the same as the first encryption key in a case where a symmetric key is used) corresponding to the first encryption key in order to recover the utilization term information for the purpose of authentication. In the first example described above, the utilization term information is irreversibly converted to an authentication code whereas, in the second example, the utilization term information is reversibly converted and written in an RFID tag 25. Hence, the utilization term information after reverse conversion (recovery) at the tag reader 300 side includes logically interpretable content. Thus, in the second example, the information transfer from the reader/writer 100 to the tag reader 300 can have flexibility (for example, additional information can be added depending on system requirements or user needs).

Under control by the control unit 170, the reading and writing unit 110 writes, in an RFID tag 25, the authentication information generated by the generation unit 180 in accordance with one of the methods described above.

(2) Management Server

As illustrated in FIG. 4, the management server 200 includes a communication I/F 210, a lock management unit 220, and a management database (DB) 230.

The communication I/F 210 is a communication interface for the management server 200 to communicate with other apparatuses. The communication I/F 210 may be a wired communication interface or may be a wireless communication interface. In the present embodiment, the communication I/F 210 communicates with the reader/writer 100 and a not-illustrated user terminal.

The lock management unit 220 is a software module that provides a management function for managing the one or more lock targets 10 under the management of the lock management system 1. The software module may operate by a computer program stored in a memory (not illustrated) being executed by one or more processors (not illustrated) of the management server 200.

In the present embodiment, the lock management unit 220 accepts inputs (utilization reservation) of utilization schedule information for the lock target 10 from the user terminal via the communication I/F 210. For example, the lock management unit 220 displays an input acceptance screen on the display of the user terminal and may prompt the user or the administrator to select a user ID, a lock target to be utilized, and a utilization term on the input acceptance screen. Then, the lock management unit 220 registers the input utilization schedule information in the management DB 230.

Also, the lock management unit 220 accepts an inquiry about the utilization schedule information from the reader/writer 100 via the communication I/F 210. In the first implementation example described above, the lock management unit 220 extracts the utilization schedule information associated with the tag ID included in the received inquiry from the management DB 230. Then, the lock management unit 220 sends back the extracted utilization schedule information to the reader/writer 100. In the second or third implementation example described above, the lock management unit 220 extracts the utilization schedule information associated with the user ID (user ID of the user who has accessed the reader/writer 100) included in the received inquiry from the management DB 230. Then, the lock management unit 220 sends back the extracted utilization schedule information to the reader/writer 100.

The management DB 230 consists of tables for storing the utilization schedule information for the one or more lock targets under the management of the lock management system 1. In the present embodiment, the management DB 230 includes a tag table 240, a user table 250, a lock target table 260, and a utilization schedule table 270.

The tag table 240 is a table that stores information relating to the RFID tags under the management of the lock management system 1. For example, the tag table 240 may include one or more of the following information items:

"Tag ID", and

"Tag Type".

"Tag ID" is identification information for uniquely identifying each RFID tag. Each tag ID, as described above, may be decided with a standard format, such as a concatenation of the company code, an item code and a serial number, and may be registered in the tag table 240 as well as being prewritten in the EPC area of each RFID tag. However, instead of a standard format, an original format may be used for the tag ID. "Tag Type" represents the type of each RFID tag. For example, a plurality of different tag types can be defined, including such as "Authentication Tag" for a tag type of an RFID tag 25 in which authentication information is to be written, and "User Identification Tag" for a tag type of a further RFID tag storing a user ID.

The user table 250 is a table that stores information relating to users with a possibility of utilizing a lock target. For example, the user table 250 may include one or more of the following information items:
 "User ID",
 "Name",
 "Related Tag ID", and
 "Privileges".

"User ID" is identification information for uniquely identifying each user. "Name" represents a name (for example, a user name displayed on a screen or recorded in the history information) of each user. "Related Tag ID" identifies an RFID tag associated with each user with "Tag ID" in the tag table 240. The RFID tag associated with each user may be the RFID tag carried or worn by each user (for example, the RFID tag of the helmet owned by each user 20). "Privileges" represents privileges relating to utilization of a lock target granted to each user. For example, in a case where two or more lock targets are under the management of the lock management system 1, different privileges for the lock targets may be granted to each user. The lock management unit 220 may reject registration of a utilization schedule for utilization of a lock target by a user who has not been given a utilization privilege for that lock target.

The lock target table 260 is a table that stores information relating to the lock targets under the management of the lock management system 1. For example, the lock target table 260 may include one or more of the following information items:
 "Target ID",
 "Name",
 "Target Type", and
 "Reader ID".

"Target ID" is identification information for uniquely identifying each lock target. "Name" represents a name (for example, a name displayed on a screen or recorded in the history information) of each lock target. "Target Type" represent the type of each lock target. For example, the "Target Type" of the lock target 10 in FIG. 1 may be a "Mobile Elevating Work Platform". "Reader ID" is identification information for identifying a tag reader attached to each lock target.

The utilization schedule table 270 is a table that stores the utilization schedule information indicating which user is scheduled to utilize a lock target at what time. For example, the utilization schedule table 270 may include one or more of the following information items:
 "Utilization Target ID",
 "Utilizing User", and
 "Utilization Term".

"Utilization Target ID" identifies a lock target to be utilized with "Target ID" in the lock target table 260. "Utilizing User" identifies a user scheduled to utilize the lock target identified by "Utilization Target ID" with "User ID" or "Related Tag ID" in the user table 250. "Utilization Term" identifies a term of utilization by the user identified by "Utilizing User" of the lock target identified by "Utilization Target ID". Each utilization term, for example, may be identified by a reference time in a case where the duration of the term is constant, may be identified by a pair including a start time and an end time, or may be identified by an identifier preassigned to each term.

Note that the table configuration of the management DB 230 described above is merely an example. The management DB 230 may be configured of more or less tables. Also, each table may include more or less information items. For example, the lock target table 260 may further include information relating to the switching apparatus attached to each lock target (for example, apparatus ID, name, type, and the like for identifying each apparatus). Alternatively, the management DB 230 may include an independent table that stores information relating to the switching apparatus. To identify the lock target, instead of the target ID described above, an apparatus ID for identifying the switching apparatus or a reader ID for identifying the tag reader may be used.

(3) Tag Reader

Figure 6:
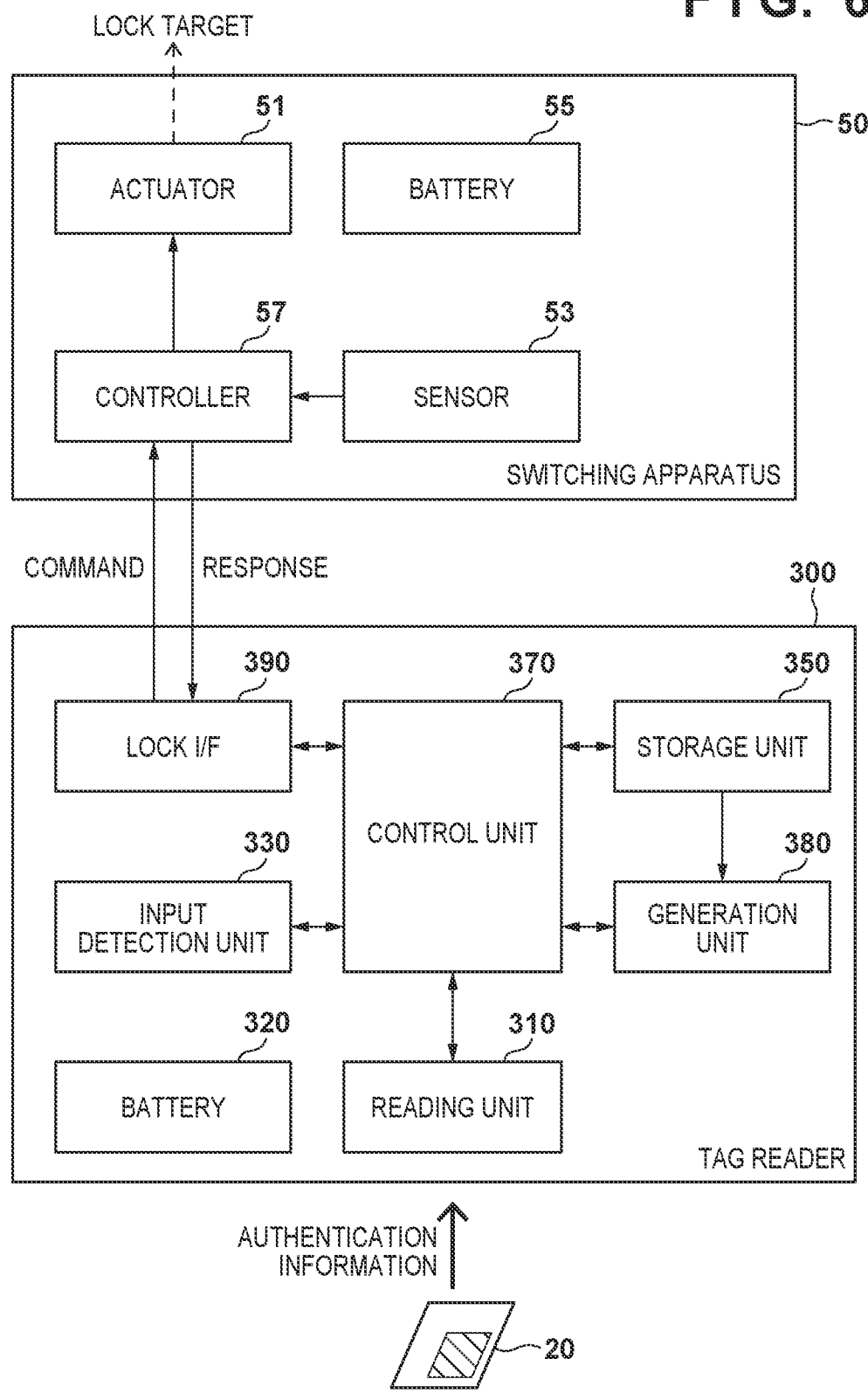
FIG. 6 is a block diagram illustrating an example of configurations of the tag reader and the switching apparatus according to the first embodiment.

FIG. 6 is a block diagram illustrating an example of configurations of the tag reader 300 and the switching apparatus 50 according to the present embodiment. As illustrated in FIG. 6, the tag reader 300 includes a reading unit 310, a battery 320, an input detection unit 330, a storage unit 350, a control unit 370, a generation unit 380, and a lock I/F 390.

The reading unit 310 performs communication for reading information from RFID tags 25. The detailed configuration of the reading unit 310 may be similar to a configuration of the reading and writing unit 110 of the reader/writer 100 described using FIG. 5. In the present embodiment, the reading unit 310 periodically emits electromagnetic waves within the tag reading range of the reading unit 310 and attempts to read information from an RFID tag 25. When the reading unit 310 detects a reception signal from an RFID tag 25, the reading unit 310 outputs the information (for example, the tag ID and authentication information) read from the RFID tag 25 to the control unit 370.

The battery 320 is a rechargeable battery that supplies power to the components of the tag reader 300. The battery 320 may be a lithium-ion battery, for example. Though not illustrated, the tag reader 300 may include a connection terminal for connecting the tag reader 300 to an external power supply to charge the battery 320. The battery 320 may be capable of being detached from the tag reader 300 to be exchanged with a spare battery.

The input detection unit 330 is a circuit that detects a user input for the tag reader 300. For example, the input detection unit 330 may detect a physical operation such as the button 302 illustrated in FIG. 2 being pressed as the user input. Also, the input detection unit 330 may detect speech from a user as a user input.

The storage unit 350 stores one or more computer programs to be executed by the control unit 370 and various information. The storage unit 350, for example, may include any type of storage medium, such as a ROM, a RAM, or a similar type of semiconductor memory, an optical disk, or a magnetic disk. In the present embodiment, the storage unit 350 prestores the authentication base information specific to the lock target 10.

The control unit 370 controls all of the functions of the tag reader 300 described in the present specification. For example, when the reading unit 310 has read authentication information from an RFID tag 25, the control unit 370 attempts authentication based on the read authentication information. Specifically, when performing authentication, the control unit 370 first obtains the current time and then decides term information related to the current time. For example, here, the term information may represent, out of terms defined in the same granularity as the time units of registration of utilization schedule described above, a term including the current time by a reference time of the term or another identifier. Then, the control unit 370 attempts authentication based on the decided term information and the authentication information read from the RFID tag 25.

In the first example of an authentication method based on authentication information, the storage unit 350 prestores identification information (in this example, the target ID) specific to the lock target 10 as the authentication base information. Also, the storage unit 350 prestores a symmetric key (common key) for encoding in accordance with a predetermined encoding scheme. The symmetric key may be shared by the entire system. In the variant of the first example, the symmetric key may be different for each lock target. The predetermined encoding scheme may be a scheme for outputting an authentication code corresponding to an arbitrary input of a bit sequence, such as a HMAC scheme, for example. The generation unit 380 encodes the bit sequence based on the target ID of the lock target 10 and the term information decided by the control unit 370 with the symmetric key to generate authentication information for verification (an authentication code or one-time password). Then, in a case where the authentication information read from the RFID tag 25 matches the authentication information for verification generated by the generation unit 380, the control unit 370 determines authentication to be successful.

In the second example of an authentication method based on authentication information, the storage unit 350 prestores an encryption key (a second encryption key corresponding to a first encryption key used by the reader/writer 100) specific to the lock target 10 as the authentication base information. The generation unit 380 decrypts the authentication information read from the RFID tag 25 with the second encryption key to generate (recover) the utilization term information. Then, in a case where the utilization term indicated by the recovered utilization term information appropriately corresponds to the term related to the current time, the control unit 370 determines authentication to be successful. The two terms appropriately corresponding to each other may include in its meaning, for example, the utilization term coinciding with the term related to the current time and/or the utilization term including the term related to the current time.

In a case where the control unit 370 determines authentication to be successful in accordance with any of the authentication methods described above, the control unit 370 transmits a switch command for switching the state of the lock target 10 to the switching apparatus 50 via the lock I/F 390. Here, the transmitted switch command may be an unlock command for unlocking the lock target 10. After the lock target 10 is unlocked and until the scheduled utilization term has ended or the RFID tag 25 stops being detected for a predetermined duration, the control unit 370 may maintain the unlocked state of the lock target 10. When the term for maintaining the unlocked state ends, the control unit 370 transmits a lock command for locking the lock target 10 to the switching apparatus 50 via the lock I/F 390.

Optionally, the control unit 370 may attempt authentication based on the authentication information read from the RFID tag 25 only when a predetermined user input has been detected by the input detection unit 330, and cause the switching apparatus 50 to switch the state of the lock target 10 in response to successful authentication. The predetermined user input may be the press of the button 302, for example. With a configuration in which authentication information is read from the RFID tag 25 with a user input as the trigger in this manner, the frequency of electromagnetic wave emission from the reading unit 310 can be reduced and the power of the battery 320 can be saved. This also can prevent the state of the lock target 10 from being switched at a timing not intended by the user.

The lock I/F 390 is an interface that mediates control communication (wired communication or wireless communication) between the tag reader 300 and the switching apparatus 50. The lock I/F 390 transmits a switch command (unlock command or lock command) to be input from the control unit 370 to a controller 57 of the switching apparatus 50. Also, the lock I/F 390 receives a response indicating the result of execution of the switch command from the controller 57 of the switching apparatus 50 and outputs the received response to the control unit 370.

The control unit 370 may notify the user 20, via a certain notification device, of the result of authentication based on the authentication information read from the RFID tag 25. The notification device may be the light 303 (for example, LED) illustrated in FIG. 2 or a non-illustrated display, speaker, or vibrator.

(4) Switching Apparatus

As illustrated in FIG. 6, the switching apparatus 50 includes an actuator 51, a sensor 53, a battery 55, and the controller 57.

The actuator 51 is a component for physically moving the lock mechanism of the lock target 10. For instance, in a case where the lock target 10 is a mechanical device with a cylinder lock, the actuator 51 may be a motor for rotating the key inserted into the cylinder lock. Note that in a case where the lock mechanism of the lock target 10 has an electronic or digital lock mechanism and physical movement is not required, the switching apparatus 50 may not include the actuator 51.

The sensor 53 is a component for detecting the state of the lock target 10. The sensor 53, for example, detects whether the lock target 10 is in the locked state or the unlocked state and outputs a sensor signal indicating the detected state to the controller 57.

The battery 55 is a rechargeable battery that supplies power to the components of the switching apparatus 50. The battery 55 may be a lithium-ion battery, for example. Note that the example described above is not to be interpreted as limiting, and the tag reader 300 and the switching apparatus 50 may be driven by power from a replaceable dry cell.

The controller 57 is a control circuit that controls the operations of the switching apparatus 50. For example, when the controller 57 receives an unlock command from the tag reader 300 when the lock target 10 is in the locked state, the controller 57 drives the actuator 51 to unlock the lock target 10. For example, in the example illustrated in FIG. 2, the key inserted into the keyhole 12 is rotated clockwise by the rotation of the actuator 51, and the operation of the functions of the lock target 10 that has been inhibited become available. Also, when the controller 57 receives a lock command from the tag reader 300 when the lock target 10 is in the unlocked state, the controller 57 drives the actuator 51 to lock the lock target 10. For example, in the example illustrated in FIG. 2, the key inserted into the keyhole 12 is rotated anticlockwise by the rotation of the actuator 51, and the operation of the functions of the lock target 10 become inhibited. The controller 57 sends back a response indicating the result of execution of the switch command to the tag reader 300.

Note that in the example in FIG. 6, the switching apparatus 50 and the tag reader 300 are separate apparatuses connected to each other. However, a solitary apparatus including the functions of both the switching apparatus 50 and the tag reader 300 may be provided. Also, the switching apparatus 50 may be embedded as a part of the lock target 10, and the tag reader 300 may be connected to the lock target 10.

1-3. Processing Flow

In the present section, examples of processing flows that may be executed by the apparatuses constituting the lock management system 1 according to the present embodiment will be described using the sequence diagram of FIG. 7 and the flowcharts of FIGS. 8 to 14. Note that in the following description, processing step is shortened to S (step).

1-3-1. Overall Flow

Figure 7:
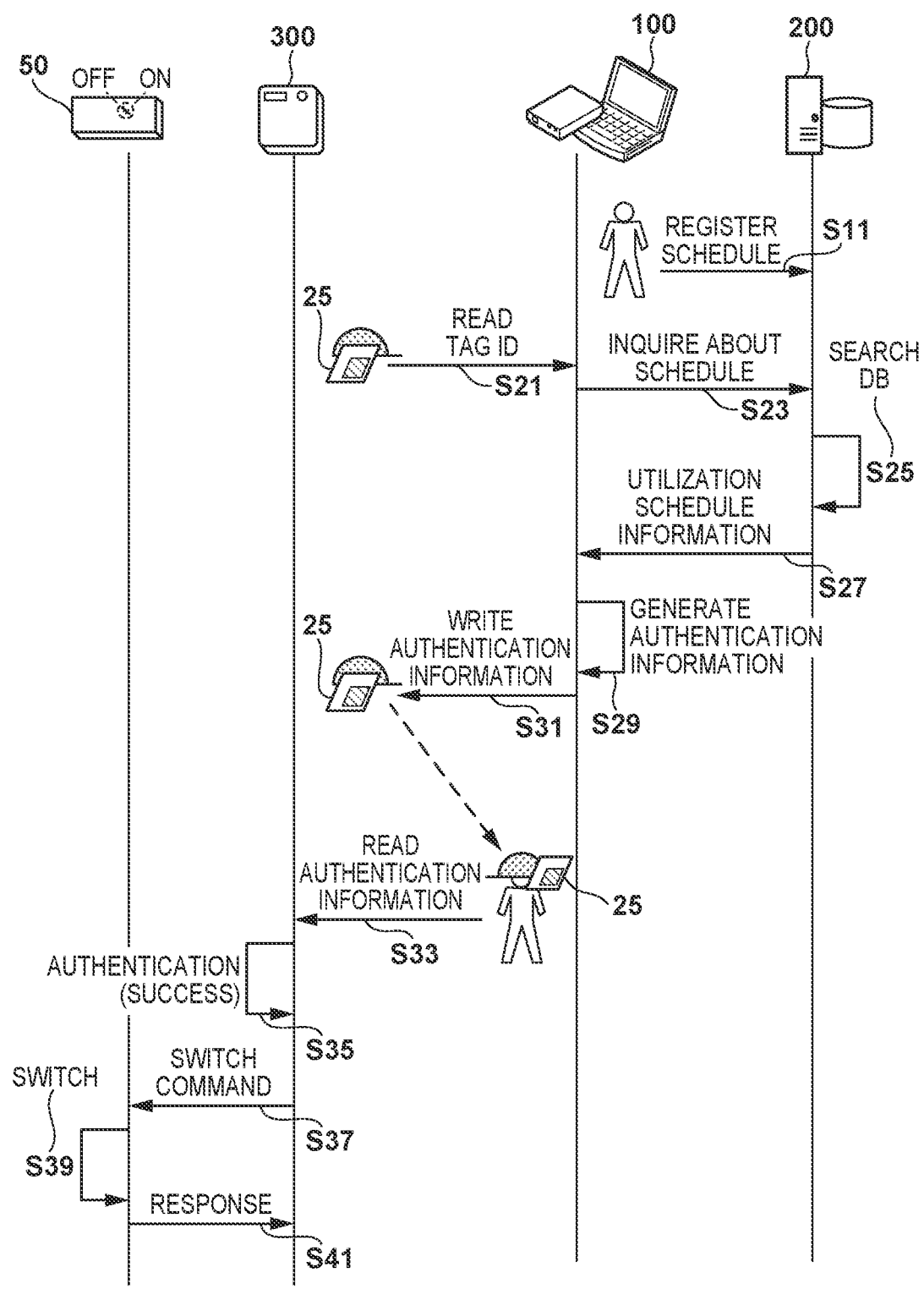
FIG. 7 is a sequence diagram illustrating an example of a work flow related to lock management according to the first embodiment.

FIG. 7 is a sequence diagram illustrating an example of a work flow related to lock management according to the present embodiment. In the sequence illustrated in FIG. 7, in addition to the reader/writer 100, the management server 200, the tag reader 300, and the switching apparatus 50, the RFID tag 25 carried by the user 20 is also involved.

First, in S11, the system administrator or user 20 inputs information related to the utilization schedule of the lock target 10 on the input acceptance screen provided by the management server 200. The lock management unit 220 of the management server 200 registers the utilization schedule information input on the screen in the utilization schedule table 270 of the management DB 230.

Thereafter, when the lock target 10 utilization time approaches, the user 20 stops at the reader/writer 100 having a helmet equipped with his or her own RFID tag 25. Then, in S21, the reading and writing unit 110 of the reader/writer 100 reads the tag ID of the RFID tag 25. Next, in S23, the control unit 170 inquires to the management server 200 about the utilization schedule information associated with the read tag ID (or the corresponding user ID). In S25, the lock management unit 220 of the management server 200 searches the utilization schedule table 270 of the management DB 230 with the ID included in the inquiry from the reader/writer 100 and extracts the utilization schedule information from the utilization schedule table 270. Next, in S27, the lock management unit 220 sends back the utilization schedule information extracted from the utilization schedule table 270 to the reader/writer 100.

In S29, the generation unit 180 of the reader/writer 100 generates authentication information to be written in the RFID tag 25 based on the utilization term information included in the utilization schedule information received from the management server 200 and the authentication base information of the lock target 10 to be utilized. Next, in S31, the reading and writing unit 110 writes the authentication information generated by the generation unit 180 in the RFID tag 25.

The user 20 visits the site 15 wearing the helmet equipped with the RFID tag 25 in which the authentication information is written in this manner and enters the tag reading range of the tag reader 300 to utilize the lock target 10.

In S33, the reading unit 310 of the tag reader 300 emits an electromagnetic wave within the tag reading range and reads the authentication information sent back from the RFID tag 25 utilizing the energy of the emitted electromagnetic wave. Next, in S35, the control unit 370 of the tag reader 300 performs authentication based on the read authentication information. Here, let's assume that authentication is successful. In S37, in response to the authentication being successful, the control unit 370 transmits a switch command for switching the state of the lock target 10 to the switching apparatus 50 via the lock I/F 390.

In S39, in response to the reception of the switch command from the tag reader 300, the controller 57 of the switching apparatus 50 drives the actuator 51 in accordance with the received switch command to switch the state of the lock target 10. Then, in S41, the controller 57 sends back a response indicating the result of execution of the switch command to the tag reader 300.

1-3-2. Writing Processing (First Implementation Example)

Figure 8:
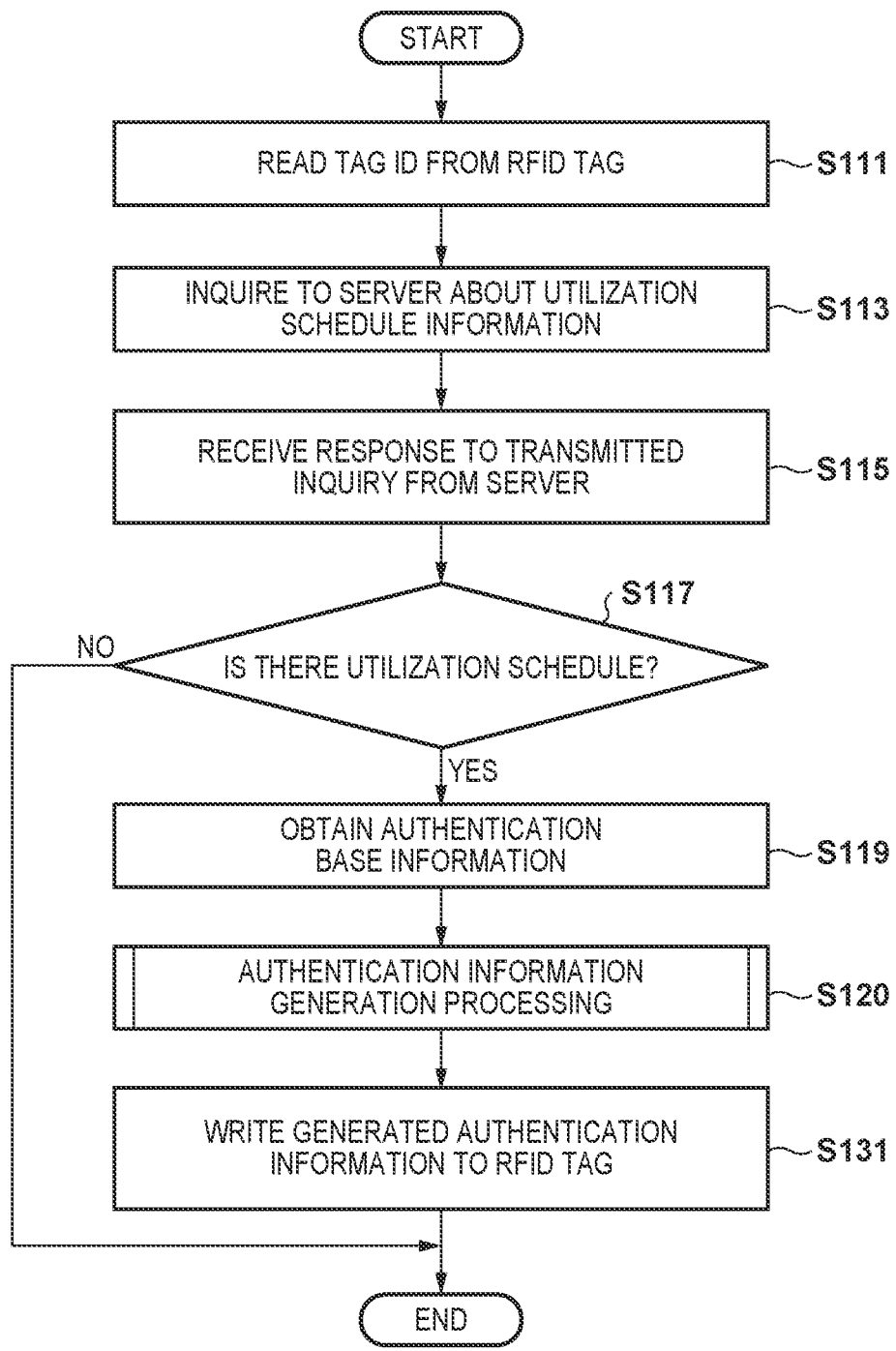
FIG. 8 is a flowchart illustrating a first example of a flow of a writing processing that can be executed by the reader/writer.

FIG. 8 is a flowchart illustrating a first example of the flow of the writing processing that can be executed by the reader/writer 100 according to the present embodiment. The writing processing is related to the flow from S21 to S31 in FIG. 7. The first example corresponds to the first implementation example described above.

First, in S111, the reading and writing unit 110 reads the tag ID from the second storage area (for example, the EPC area) of the RFID tag 25. The reading and writing unit 110 outputs the read tag ID to the control unit 170.

Next, in S113, the control unit 170 includes the tag ID read by the reading and writing unit 110 in an inquiry for utilization schedule information and transmits the inquiry to the management server 200 via the communication I/F 140.

Next, in S115, the control unit 170 receives a response to the transmitted inquiry from the management server 200 via the communication I/F 140. In a case where a recent utilization schedule related to the tag ID included in the inquiry does not exist in the management DB 230, the received response here may include information indicating that there is no utilization schedule. In a case where a recent utilization schedule does exist, the received response here includes the utilization schedule information related to at least one utilization schedule.

In S117, the control unit 170 determines whether or not utilization schedule information is included in the response received from the management server 200. In a case where utilization schedule information is not included, the subsequent S119 to S132 are skipped, and the writing processing of FIG. 8 ends without any authentication information being written in the RFID tag 25. In a case where utilization schedule information is included, the processing proceeds to S119.

In S119, the control unit 170 obtains authentication base information specific to the lock target 10 scheduled to be utilized. For example, the authentication base information is received from the management server 200 together with the utilization schedule information or prestored in the storage unit 150.

Next, in S120, the control unit 170 and the generation unit 180 execute authentication information generation processing to generate authentication information. Here, some examples of the detailed flow of the authentication information generation processing will be further described below.

Next, in S131, in accordance with control by the control unit 170, the reading and writing unit 110 writes the authentication information generated in S120 in the first storage area (for example, the user area) of the RFID tag 25. Then, the writing processing of FIG. 8 ends.

1-3-3. Writing Processing (Second Implementation Example)

Figure 9:
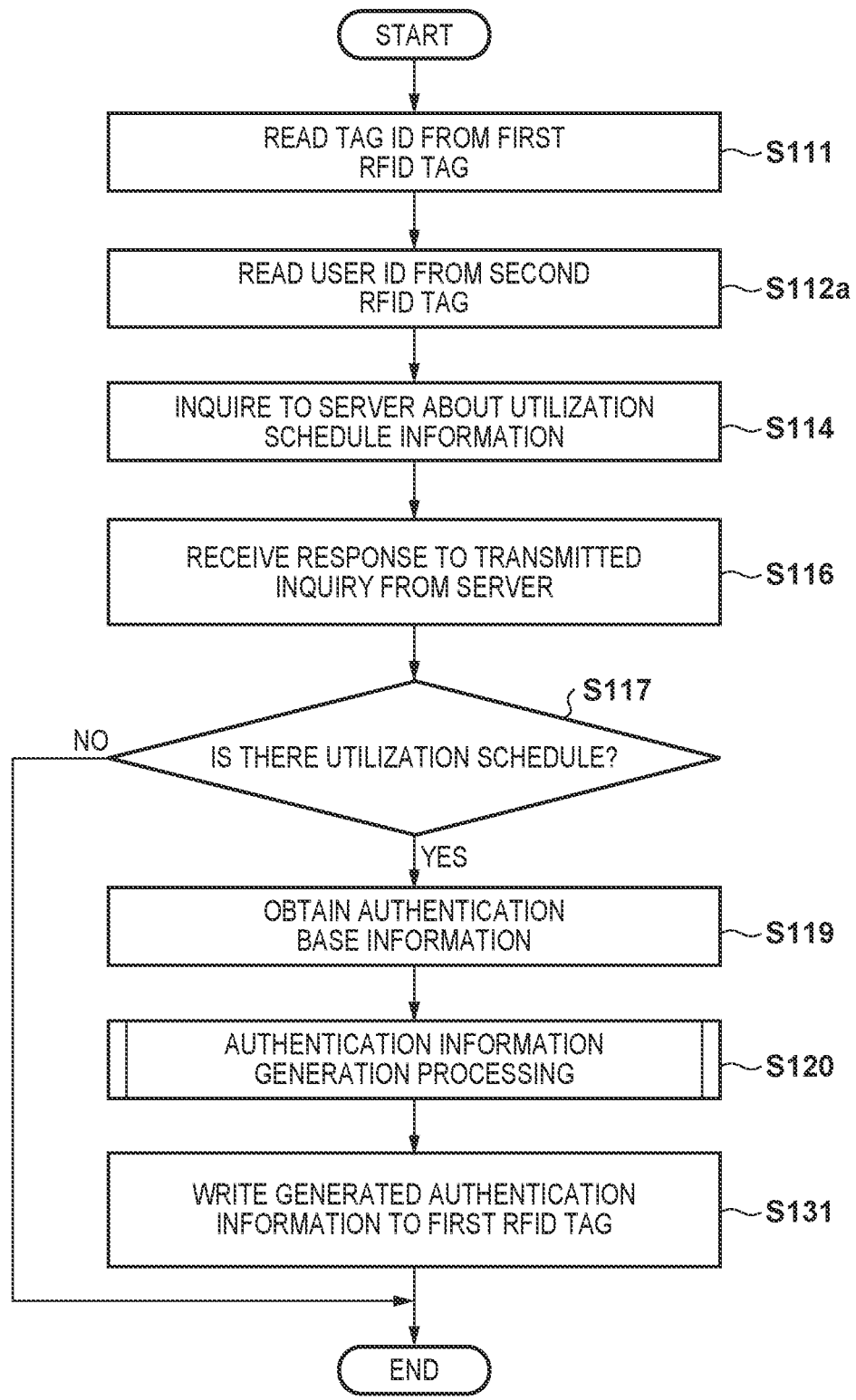
FIG. 9 is a flowchart illustrating a second example of a flow of a writing processing that can be executed by the reader/writer.

FIG. 9 is a flowchart illustrating a second example of the flow of the writing processing that can be executed by the reader/writer 100 according to the present embodiment. The writing processing is related to the flow from S21 to S31 in FIG. 7. The second example corresponds to the second implementation example described above.

First, in S111, the reading and writing unit 110 reads the tag ID from the RFID tag 25 (first RFID tag). The reading and writing unit 110 outputs the read tag ID to the control unit 170.

Next, in S112a, the reading and writing unit 110 further reads the user ID from an RFID tag (second RFID tag). The reading and writing unit 110 outputs the read user ID to the control unit 170.

Next, in S114, the control unit 170 includes the user ID read by the reading and writing unit 110 in an inquiry for utilization schedule information and transmits the inquiry to the management server 200 via the communication I/F 140.

Next, in S116, the control unit 170 receives a response to the transmitted inquiry from the management server 200 via the communication I/F 140. In a case where a recent utilization schedule related to the user ID included in the inquiry does not exist in the management DB 230, the received response here may include information indicating that there is no utilization schedule. In a case where a recent utilization schedule does exist, the received response here includes the utilization schedule information related to at least one utilization schedule.

In S117, the control unit 170 determines whether or not utilization schedule information is included in the response received from the management server 200. In a case where utilization schedule information is not included, the subsequent S119 to S131 are skipped, and the writing processing of FIG. 9 ends without any authentication information being written in the first RFID tag. In a case where utilization schedule information is included, the processing proceeds to S119.

In S119, the control unit 170 obtains authentication base information specific to the lock target 10 scheduled to be utilized. For example, the authentication base information is received from the management server 200 together with the utilization schedule information or prestored in the storage unit 150.

Next, in S120, the control unit 170 and the generation unit 180 execute authentication information generation processing to generate authentication information.

Next, in S131, in accordance with control by the control unit 170, the reading and writing unit 110 writes the authentication information generated in S120 in the RFID tag. Then, the writing processing of FIG. 9 ends.

1-3-4. Writing Processing (Third Implementation Example)

Figure 10:
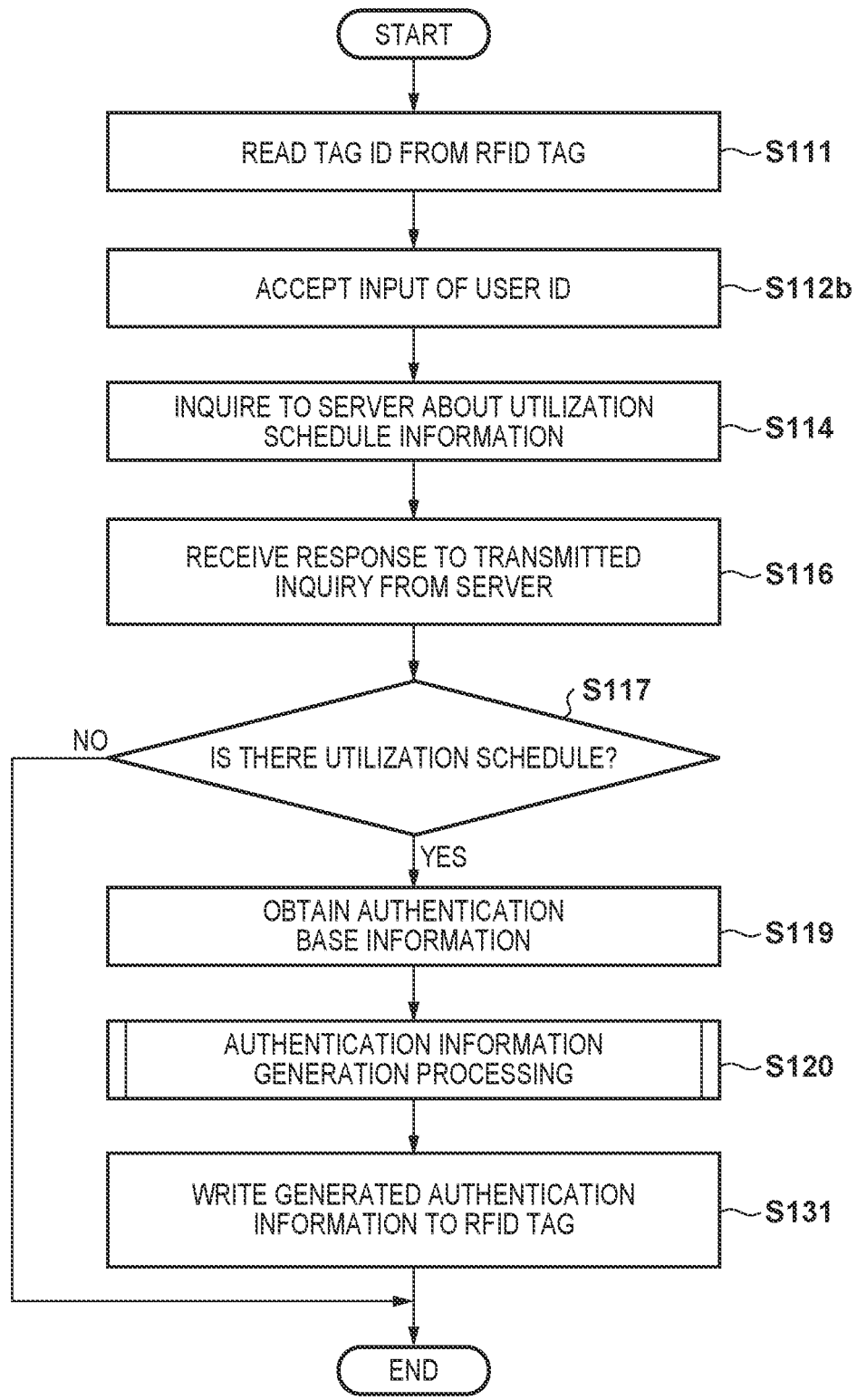
FIG. 10 is a flowchart illustrating a third example of a flow of a writing processing that can be executed by the reader/writer.

FIG. 10 is a flowchart illustrating a third example of the flow of the writing processing that can be executed by the reader/writer 100 according to the present embodiment. The writing processing is related to the flow from S21 to S31 in FIG. 7. The third example corresponds to the third implementation example described above.

First, in S111, the reading and writing unit 110 reads the tag ID from the RFID tag 25. The reading and writing unit 110 outputs the read tag ID to the control unit 170.

Next, in S112b, the control unit 170 accepts the user ID and other information input by the user 20 on a login screen displayed on a display, for example.

Next, in S114, the control unit 170 includes the user ID accepted in S112b in an inquiry for utilization schedule information and transmits the inquiry to the management server 200 via the communication I/F 140.

Next, in S116, the control unit 170 receives a response to the transmitted inquiry from the management server 200 via the communication I/F 140. In a case where a recent utilization schedule related to the user ID included in the inquiry does not exist in the management DB 230, the received response here may include information indicating that there is no utilization schedule. In a case where a recent utilization schedule does exist, the received response here includes the utilization schedule information related to at least one utilization schedule.

In S117, the control unit 170 determines whether or not utilization schedule information is included in the response received from the management server 200. In a case where utilization schedule information is not included, the subsequent S119 to S131 are skipped, and the writing processing of FIG. 10 ends without any authentication information being written in the RFID tag 25. In a case where utilization schedule information is included, the processing proceeds to S119.

The flow of the processing from S119 to S131 may be similar to that described using FIG. 8. When the authentication information has been written in the RFID tag 25 by the reading and writing unit 110 in S131, the writing processing of FIG. 10 ends.

1-3-5. Authentication Information Generation Processing (First Example)

Figure 11:
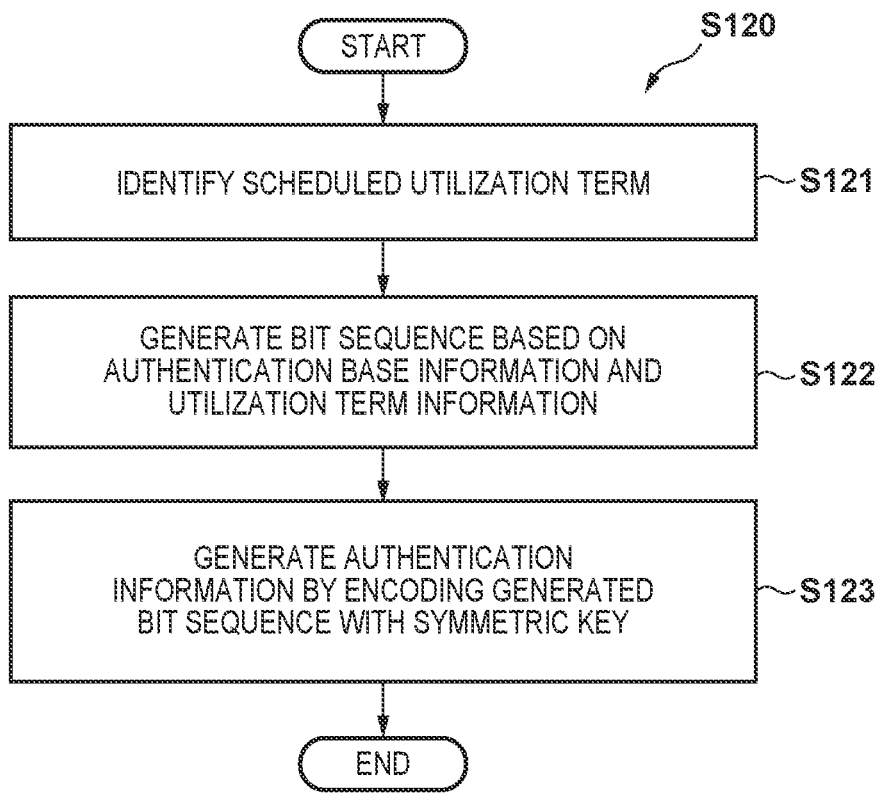
FIG. 11 is a flowchart illustrating a first example of a flow of an authentication information generation processing that can be executed by the reader/writer.

FIG. 11 is a flowchart illustrating a first example of the flow of the authentication information generation processing that can be executed by the reader/writer 100 according to the present embodiment.

First, in S121, the control unit 170 identifies the utilization term indicated by the utilization schedule information received from the management server 200.

Next, in S122, the generation unit 180 generates a bit sequence to be input into an encoding algorithm based on the authentication base information (for example, utilization target ID) and the utilization term information.

Next, in S123, the generation unit 180 encodes the bit sequence generated in S122 in accordance with a predetermined encoding scheme with a symmetric key shared by the entire system or specific to the lock target to be utilized to generate authentication information.

1-3-6. Authentication Information Generation Processing (Second Example)

Figure 12:
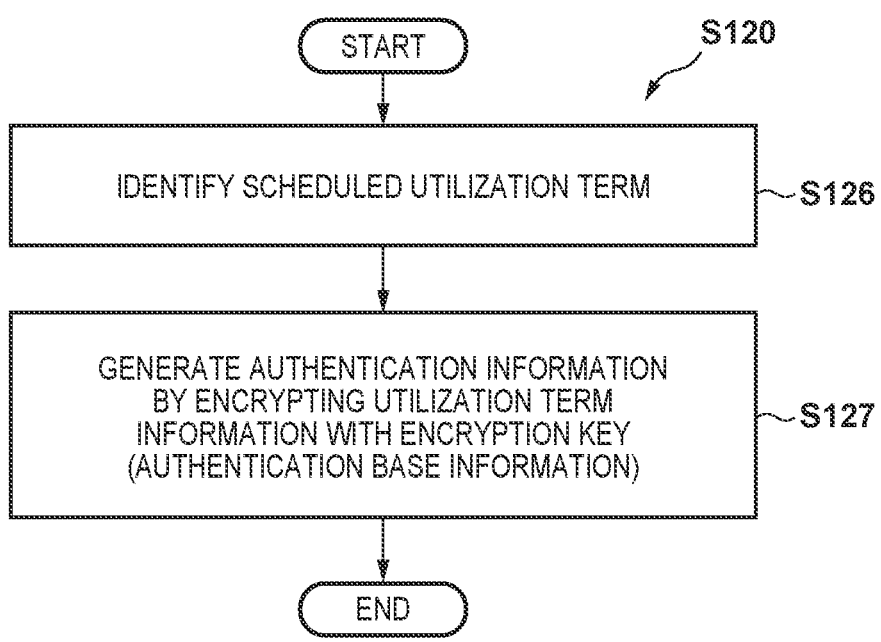
FIG. 12 is a flowchart illustrating a second example of a flow of an authentication information generation processing that can be executed by the reader/writer.

FIG. 12 is a flowchart illustrating a second example of the flow of the authentication information generation processing that can be executed by the reader/writer 100 according to the present embodiment.

First, in S126, the control unit 170 identifies the utilization term indicated by the utilization schedule information received from the management server 200.

Next, in S127, the generation unit 180 encrypts the utilization term information related to the identified utilization term with the authentication base information (for example, the first encryption key specific to the lock target to be utilized) to generate authentication information.

1-3-7. Authentication Processing (First Example)

Figure 13:
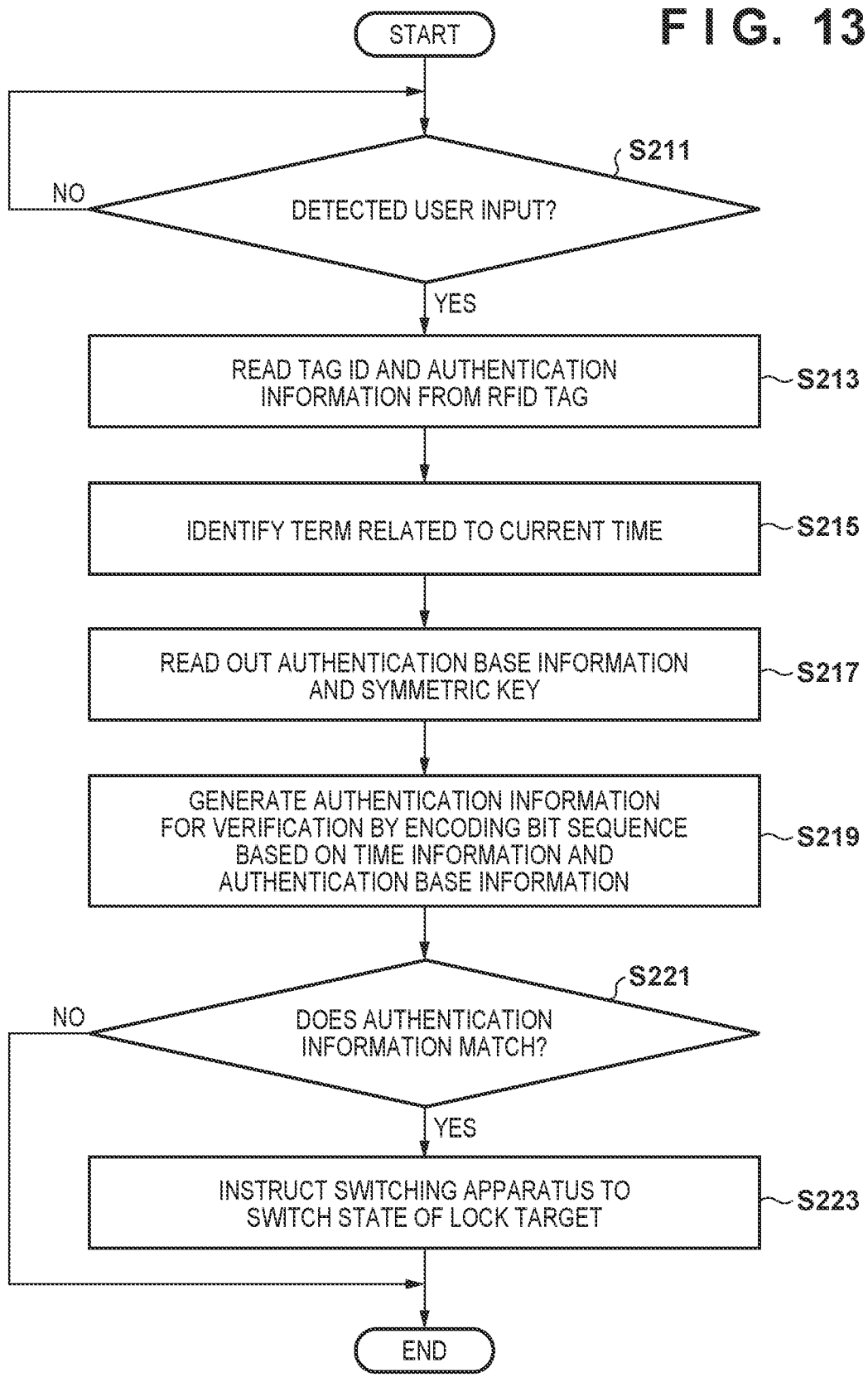
FIG. 13 is a flowchart illustrating a first example of a flow of an authentication processing that can be executed by the tag reader.

FIG. 13 is a flowchart illustrating a first example of the flow of the authentication processing that can be executed by the tag reader 300 according to the present embodiment. The authentication processing is related to the flow from S33 to S41 in FIG. 7.

First, in S211, the input detection unit 330 continuously monitors for a user input. When a predetermined user input (for example, the press of the button 302) is detected by the input detection unit 330, the processing proceeds to S213.

In S213, the reading unit 310 emits an electromagnetic wave within the tag reading range and reads the tag ID and authentication information sent back from the RFID tag 25. In this example, the read authentication information is information generated by the authentication information generation processing described using FIG. 11 (for example, an authentication code).

Next, in S215, the control unit 370 obtains the current time by referencing an internal clock that measures the actual time and identifies the term related to the obtained current time.

Next, in S217, the generation unit 380 reads out the authentication base information (for example, the utilization target ID) and the symmetric key shared by the entire system or specific to the lock target 10 from the storage unit 350.

Next, in S219, the generation unit 380 encodes a bit sequence based on the time information (for example, a reference time or term identifier) related to the identified term and the read out authentication base information with the read out symmetric key to generate authentication information for verification.

Next, in S221, the control unit 370 determines whether the authentication information read from the RFID tag 25 in S213 matches the authentication information for verification generated by the generation unit 380 in S219. Here, in a case where the two pieces of authentication information do not match, authentication fails. Thus, the subsequent S223 is skipped, and the authentication processing in FIG. 13 ends without unlocking (or locking) the lock target 10.

In a case where the two pieces of authentication information match in S221, in S223, the control unit 370 determines authentication to be successful and instructs the switching apparatus 50 to switch the state of the lock target 10 (for example, from the locked state to the unlocked state). When a response indicating completion of the state switching is received from the switching apparatus 50, the authentication processing in FIG. 13 ends.

1-3-8. Authentication Processing (Second Example)

Figure 14:
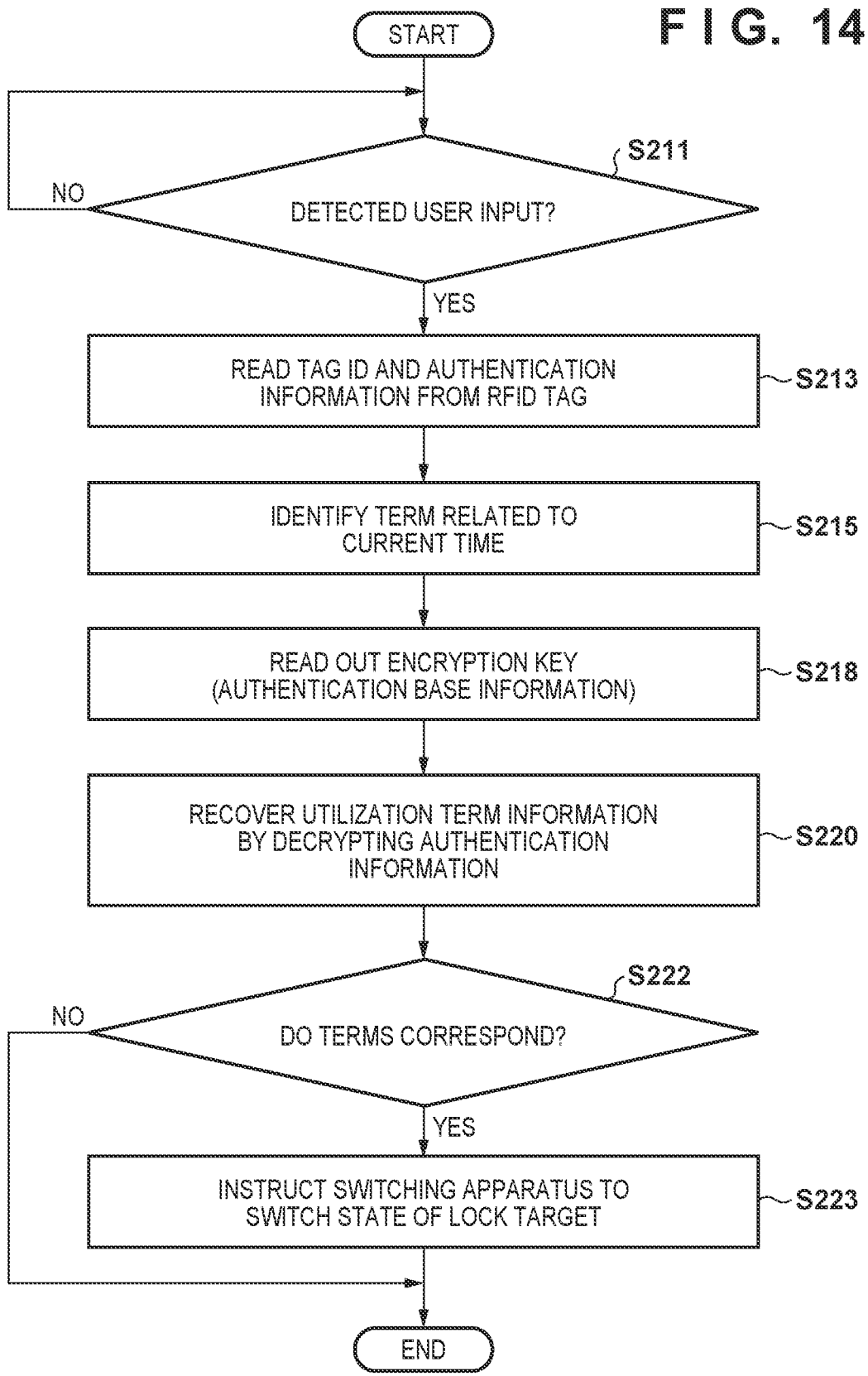
FIG. 14 is a flowchart illustrating a second example of a flow of an authentication processing that can be executed by the tag reader.

FIG. 14 is a flowchart illustrating a second example of the flow of the authentication processing that can be executed by the tag reader 300 according to the present embodiment. The authentication processing is related to the flow from S33 to S41 in FIG. 7.

First, in S211, the input detection unit 330 continuously monitors for a user input. When a predetermined user input is detected by the input detection unit 330, the processing proceeds to S213.

In S213, the reading unit 310 emits an electromagnetic wave within the tag reading range and reads the tag ID and authentication information sent back from the RFID tag 25. In this example, the read authentication information is information generated by the authentication information generation processing described using FIG. 12 (encrypted utilization term information).

Next, in S215, the control unit 370 obtains the current time by referencing an internal clock that measures the actual time and identifies the term related to the obtained current time.

Next, in S218, the generation unit 380 reads out the second encryption key (authentication base information) specific to the lock target 10 from the storage unit 350.

Next, in S220, the generation unit 380 decrypts the authentication information read from the RFID tag 25 with the second encryption key read out in S218 to recover the utilization term information.

Next, in S222, the control unit 370 determines whether the utilization term indicated by the utilization term information recovered by the generation unit 380 appropriately corresponds to the term identified in S215. Here, in a case where the two terms do not appropriately correspond to each other, authentication fails. Thus, the subsequent S223 is skipped, and the authentication processing in FIG. 14 ends without unlocking (or locking) the lock target 10.

In a case where the two terms appropriately correspond to each other in S222, in S223, the control unit 370 determines authentication to be successful and instructs the switching apparatus 50 to switch the state of the lock target 10 (for example, from the locked state to the unlocked state). When a response indicating completion of the state switching is received from the switching apparatus 50, the authentication processing in FIG. 14 ends.

Note that in the examples described for the authentication information generation processing in FIG. 12 and the authentication processing of FIG. 14, an encryption key is used to encrypt and decrypt the utilization term information. However, the utilization term information may be written in an RFID tag without being encrypted. For example, in an environment where the threat of unauthorized writing of information in an RFID tag can be ignored, the plaintext utilization term information may be written in an RFID tag (for example, together with the utilization target ID), and a simple authentication may be performed by comparison with the term related to the current time in the tag reader 300. In this manner, the calculation load on the reader/writer 100 and the tag reader 300 can be mitigated, and the complexity of implementation can be reduced to suppress costs for system construction. In addition, the terms encryption and decryption may be substituted with conversion and inverse conversion.

2. SECOND EMBODIMENT

In the present section, as the second embodiment, an example is described in which a function for collecting information related to lock management is implemented into the apparatuses constituting the lock management system described in the preceding section in addition to the functions described above.

2-1. System Overview

Figure 15:
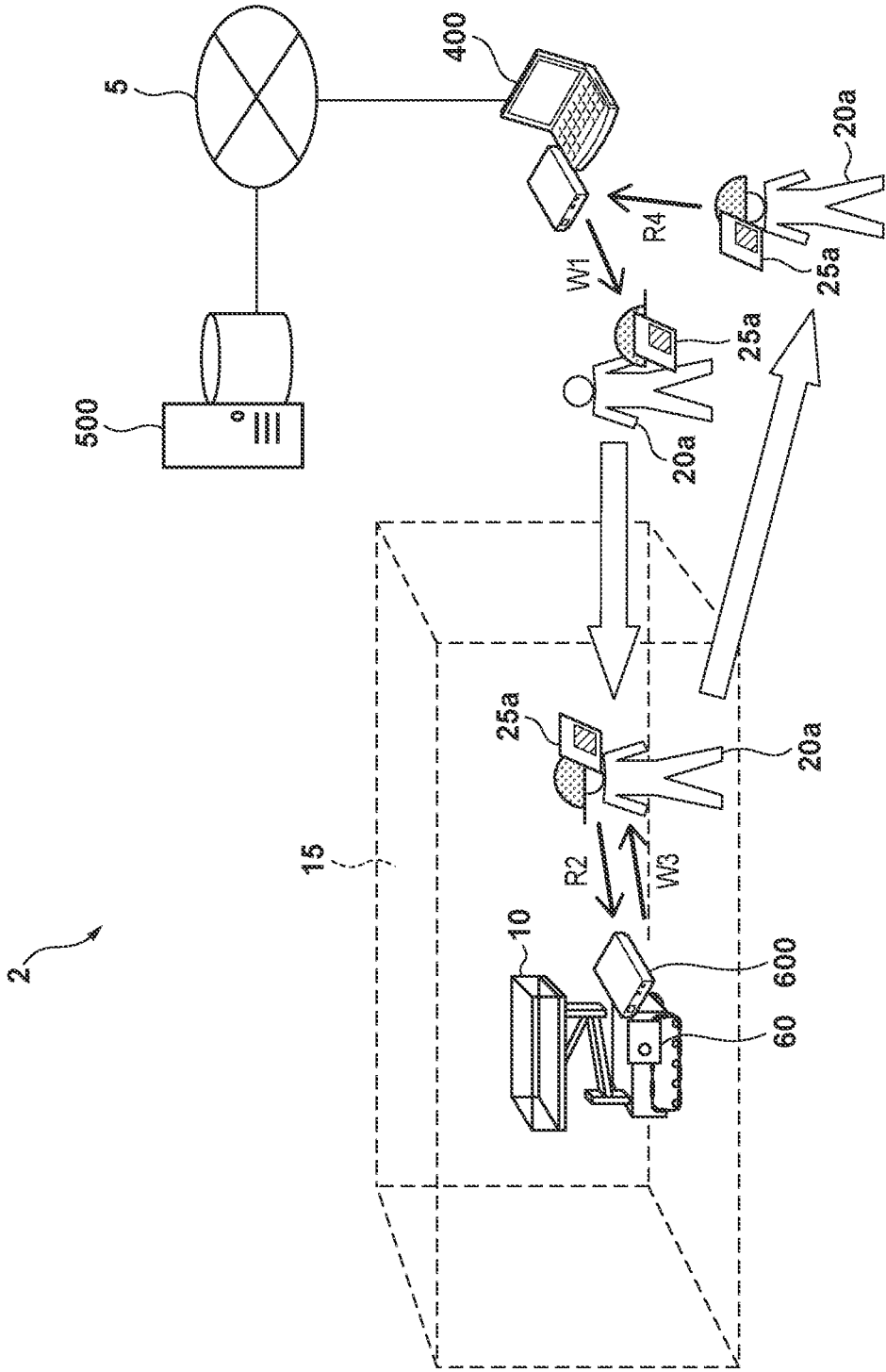
FIG. 15 is a schematic diagram illustrating an overview of a lock management system according to a second embodiment.

FIG. 15 is a schematic diagram illustrating an overview of a lock management system 2 according to the second embodiment. As with the lock management system 1, the lock management system 2 is a system for managing states of one or more lock targets existing in a real space through authentication based on information written in RFID tags. The lock management system 2 includes a switching apparatus 60, a reader/writer 400, a management server 500, and a tag reader 600. The switching apparatus 60 and the tag reader 600 may be attached to the lock target 10, which is a mobile elevating work platform, and are capable of moving together with the lock target 10.

The reader/writer 400 is a reading and writing apparatus capable of writing information in an RFID tag 25 carried or worn by a user 20 and capable of reading information from an RFID tag 25. The reader/writer 400 is connected to the management server 500 via the network 5. The management server 500 is an information processing apparatus that uses a database to manage utilization schedule information indicating a schedule of when what users can utilize a lock target. In the present embodiment, the management server 500 further manages, in addition to the utilization schedule information, history information related to switching of states of lock targets and status information indicating statuses of the apparatuses. Here, the apparatuses may include one or more of a switching apparatus and a tag reader. This information may be viewed by the system administrator and provided for applications including system maintenance and operational support and assisting users to establish a work plan.

The tag reader 600 is a reading apparatus capable of reading information from an RFID tag 25. However, in the present embodiment, the tag reader 600 may further be capable of writing information in an RFID tag 25. The tag reader 600 is connected to the switching apparatus 60. The switching apparatus 60 is an apparatus that is capable of switching the state of the lock target 10 between the locked state and the unlocked state.

In the present embodiment as well, the reader/writer 400 obtains utilization schedule information related to the lock target 10 from the management server 500 and writes authentication information in a rewritable storage area of an RFID tag 25 based on the obtained utilization schedule information (arrow W1 in the diagram). The tag reader 600 reads, from the RFID tag 25 (arrow R2 in the diagram), the authentication information written in the RFID tag 25 by the reader/writer 400. Also, in a case where authentication based on the read authentication information is successful, the tag reader 600 causes the switching apparatus 60 to switch the state of the lock target 10. For example, when the state of the lock target 10 is switched from the locked state to the unlocked state, the user becomes able to utilize the functions of the lock target 10.

Furthermore, the tag reader 600 generates history information related to switching of the state of the lock target 10. Also, the tag reader 600 detects a status of one or more of the lock target 10, the switching apparatus 60 and the tag reader 600 and generates status information indicating the detected status. The tag reader 600 writes the generated history information and the status information in a rewritable storage area of the RFID tag 25 (arrow W3 in the diagram). The user 20 leaves the site 15 together with the RFID tag 25 in which the history information and the status information are written and stops again at the reader/writer 400. The reader/writer 400 reads, from the RFID tag 25 (arrow R4 in the diagram), the history information and the status information generated by the tag reader 600, and transmits the read information to the management server 500.

In the present embodiment, various information related to lock management may be collected from the one or more sites 15 using RFID tags 25 as information transfer media in this manner and accumulated in the database of the management server 500.

2-2. Apparatus Configuration Examples

Next, examples of more detailed configurations of the apparatuses constituting the lock management system 2 will be described in order using FIGS. 16 and 17.

(1) Reader/Writer

Figure 16:
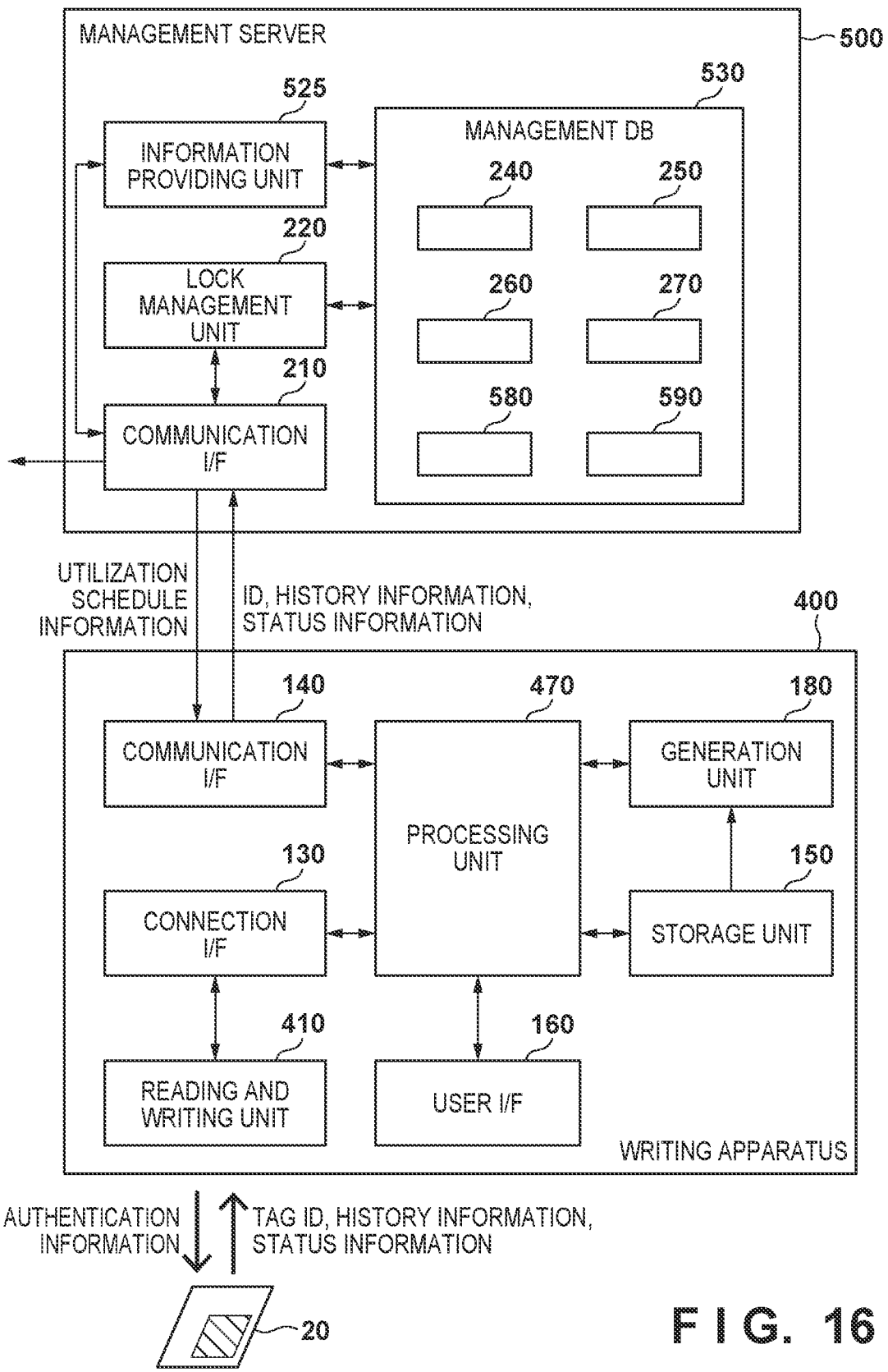
FIG. 16 is a block diagram illustrating an example of configurations of a reader/writer and a management server according to the second embodiment.

FIG. 16 is a block diagram illustrating an example of configurations of the reader/writer 400 and the management server 500 according to the present embodiment. As illustrated in FIG. 16, the reader/writer 400 includes a reading and writing unit 410, the connection I/F 130, the communication I/F 140, the storage unit 150, the user I/F 160, a control unit 470, and the generation unit 180. It should be noted that only the differences in the configuration of the reader/writer 400 from the reader/writer 100 according to the first embodiment will be described here.

The reading and writing unit 410 performs communication for reading information from RFID tags 25 and writing information in RFID tags 25. The detailed configuration of the reading and writing unit 410 may be similar to the configuration of the reading and writing unit 110 of the reader/writer 100 according to the first embodiment described using FIG. 5.

The control unit 470 controls all of the functions of the reader/writer 400 according to the present embodiment. For example, in a case where the user 20 has placed an RFID tag within the tag reading range of the reader/writer 400, the control unit 470 causes the reading and writing unit 410 to read the tag ID from a predetermined storage area of the RFID tag. In a case where the read tag ID is an ID of the RFID tag 25 under the management of the lock management system 2, the control unit 470 inquires to the management server 500 about the utilization schedule information to determine whether to write the authentication information in the RFID tag 25. The inquiry about the utilization schedule information to the management server 500 may be performed in accordance with any one of the first to third implementation examples described above. In response to the inquiry, the management server 500 sends back the utilization schedule information to the reader/writer 400. When the utilization schedule information is received from the management server 500, the control unit 470 causes the generation unit 180 to generate authentication information based on the utilization term information included in the utilization schedule information and the authentication base information specific to the lock target to be utilized. Then, the control unit 470 causes the reading and writing unit 410 to write the generated authentication information in the RFID tag 25.

Also, in the present embodiment, in a case where the history information and the status information are written in the RFID tag 25 within the tag reading range of the reader/writer 400, the control unit 470 causes the reading and writing unit 410 to read the history information and the status information. The control unit 470 transmits the history information and the status information read by the reading and writing unit 410 to the management server 500 via the communication I/F 140. The control unit 470 may delete the history information and the status information transmitted to the management server 500 from the RFID tag 25.

(2) Management Server

As illustrated in FIG. 16, the management server 500 includes the communication I/F 210, the lock management unit 220, an information providing unit 525, and a management DB 530. Note that only the differences in the configuration of the management server 500 from the management server 200 according to the first embodiment will be described here.

The management DB 530 consists of tables for storing information indicating the utilization schedule for the lock targets 10 under the management of the lock management system 2 and for storing information related to lock management. In the present embodiment, the management DB 530 includes the tag table 240, the user table 250, the lock target table 260, the utilization schedule table 270, a history table 580, and a status table 590.

The history table 580 is a table for storing the history information collected using RFID tags 25 as information transfer media from tag readers 600 located at one or more sites 15. For example, the history table 580 may include one or more of the following information items:

"Authentication Attempt Time",
"Authentication Result",
"Reading Source Tag ID",
"Related User",
"Related lock Target",
"Measured Position", and
"Lock Type".

"Authentication Attempt Time" indicates the time of an authentication attempt based on the authentication information written in the RFID tag 25. "Authentication Result" is information indicating whether the authentication performed at the time indicated in the "Authentication Attempt Time" has been successful or a failure. "Reading Source Tag ID" may be the tag ID of the RFID tag from which the authentication information used in the authentication described above has been read. "Related User" may be the user ID or the user name of the user carrying or wearing the RFID tag described above. "Related Lock Target" may be the target ID or the name of the lock target scheduled to be utilized at the time of authentication. "Measured Position" is position information (for example, two-dimensional or three-dimensional coordinates) indicating the position measured by the tag reader when attempting authentication. "Lock Type" is information indicating whether the lock target described above has been unlocked or locked.

The status table 590 is a table for storing the status information collected using RFID tags 25 as information transfer media from tag readers 600 located at one or more sites 15. For example, the status table 590 may include one or more of the following information items:

"Apparatus ID",
"Operation Status",
"Remaining Battery Life", and
"Status Detection Time".

"Apparatus ID" is information for identifying an apparatus of which status is represented by the status information indicated by each record of the status table 590. "Apparatus ID", for example, may be an ID provided to one of the lock target 10, the switching apparatus 60, and the tag reader 600. "Operation Status" may indicate whether the operation of a device identified by "Apparatus ID" is normal or abnormal and, when abnormal, may indicate the type of abnormality. "Remaining Battery Life" is numerical value information (state of charge with a value in a range from 0% to 100%) indicating the level of the amount of power remaining in the battery of the device identified by "Apparatus ID". "Remaining Battery Life" may be included in the status information only in a case where the apparatus is battery-driven. "Status Detection Time" indicates a generation time of the status information indicated by each record of the status table 590.

The information providing unit 525 provides the information managed in the management DB 530 to a user terminal not illustrated in FIG. 15 via the communication I/F 210. In response to a request to provide the history information received from the user terminal, for example, the information providing unit 525 may extract the history information stored in the history table 580 and transmit it to the user terminal. The history information may be provided in a data file format or may be displayed on the display of the user terminal and viewed by a system administrator. In a similar manner, in response to a request to provide the status information received from the user terminal, the information providing unit 525 may extract the status information stored in the status table 590 and transmit it to the user terminal. The status information may be provided in a data file format or may be displayed on the display of the user terminal and viewed by the system administrator. The information providing unit 525 may provide not only the history information and the status information but also the utilization schedule information and other information in the management DB 530 to the user terminal.

For example, in a case where the status information indicates that there is an abnormality in a lock target, the system administrator can search for which user was utilizing that lock target at the point in time when the abnormality was detected by referencing the history information. In a case where the history information includes position information, the system administrator can search for where the lock target was being utilized or kept at the point in time when the abnormality was detected. Also, when the history information indicates that the lock target was actually utilized for a duration shorter than a utilization term in the past indicated by the utilization schedule information, the system administrator may suggest to the user to review the work plan. Also, in a case where the status information indicates that the remaining battery life of an apparatus is low, the system administrator may send a maintenance worker to the site 15 to replace or charge the battery.

(3) Tag Reader

Figure 17:
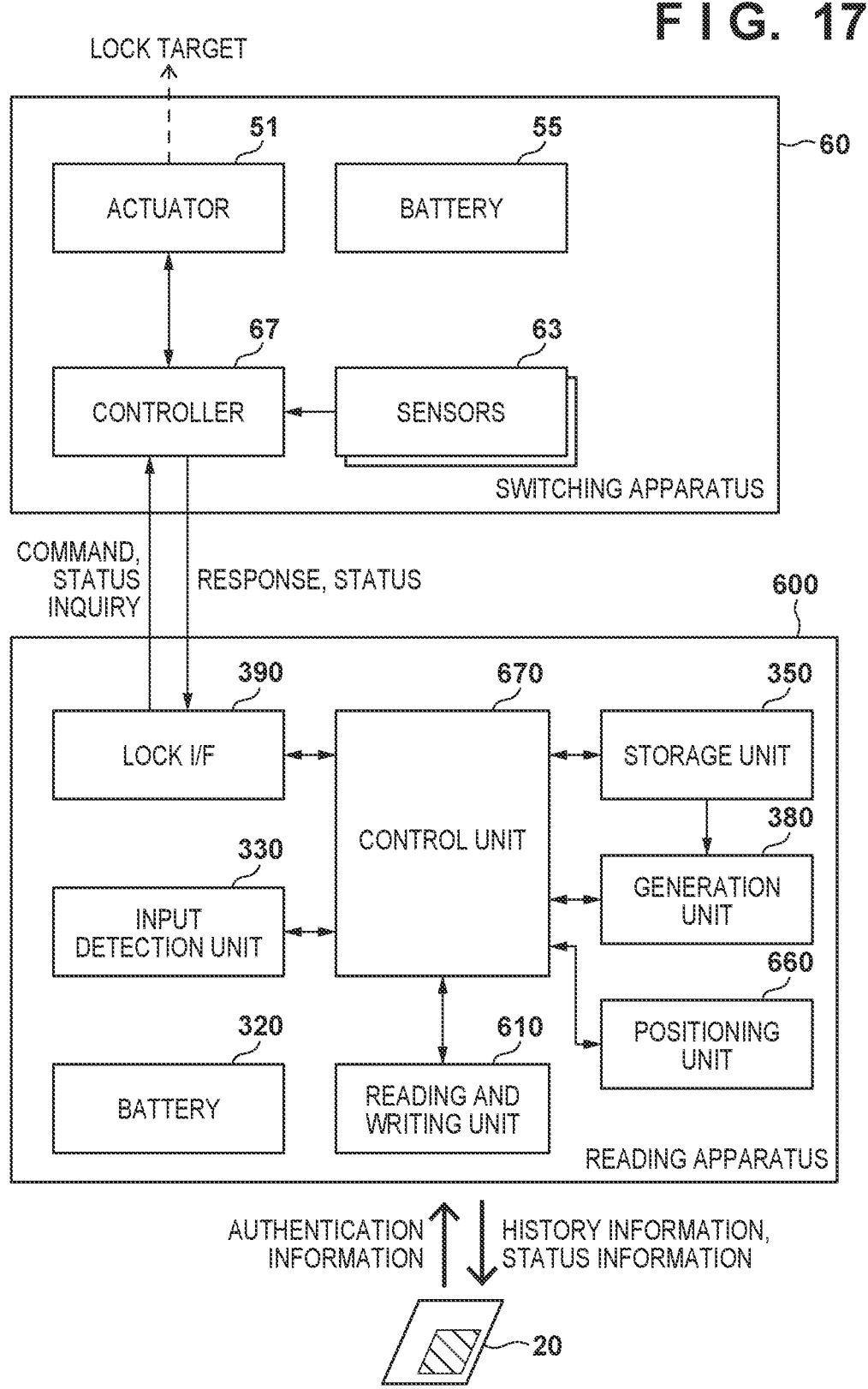
FIG. 17 is a block diagram illustrating an example of configurations of the tag reader and the switching apparatus according to the second embodiment.

FIG. 17 is a block diagram illustrating an example of configurations of the tag reader 600 and the switching apparatus 60 according to the present embodiment. As illustrated in FIG. 17, the tag reader 600 includes a reading and writing unit 610, the battery 320, the input detection unit 330, the storage unit 350, a positioning unit 660, a control unit 670, the generation unit 380, and the lock I/F 390. Note that only the differences in the configuration of the tag reader 600 from the tag reader 300 according to the first embodiment will be described here.

The reading and writing unit 610 performs communication for reading information from RFID tags 25. The detailed configuration of the reading and writing unit 610 may be similar to the configuration of the reading and writing unit 110 of the reader/writer 100 described using FIG. 5. In the present embodiment, the reading and writing unit 610 periodically emits electromagnetic waves within the tag reading range of the reading and writing unit 610 and attempts to read information from an RFID tag 25. When the reading and writing unit 610 detects a reception signal from an RFID tag 25, the reading unit 310 outputs the information (for example, the tag ID and authentication information) read from the RFID tag 25 to the control unit 670. Also, the reading and writing unit 610 writes the history information and the status information generated or obtained by the control unit 670 in a rewritable storage area (for example, the user area) of the RFID tag 25.

The positioning unit 660 is a positioning module for measuring or estimating the current position of the tag reader 600. The positioning unit 660, for example, may measure the relative movement amount from a reference position using a three-axis acceleration sensor, a gyro sensor, and a geomagnetic sensor in accordance with a known self-localization method and may calculate the positional coordinate of the current position from the sum of known coordinates of the reference position and the relative movement amount. In addition, the positioning unit 660, depending on an available communication means at the site 15, may measure the geographical position of the tag reader 600 using electromagnetic waves from GPS satellites or may estimate the current position using known positional coordinates of a base station or an access point to which it is connected. The positioning unit 660 outputs two-dimensional or three-dimensional positional coordinates indicating the current position of the tag reader 600 obtained as the positioning result to the control unit 670.

The control unit 670 controls all of the functions of the tag reader 600 described in the present specification. For example, when the reading and writing unit 610 has read authentication information from an RFID tag 25, the control unit 670 performs authentication based on the read authentication information. Specifically, when performing authentication, the control unit 670 first obtains the current time and then decides term information related to the current time. For example, here, the term information may represent a reference time (for example, start time) of a term including the current time out of terms defined in the same granularity as the time units of registration of utilization schedule described above. Then, the control unit 670 attempts authentication based on the decided term information and the authentication information read from the RFID tag 25. The authentication here may be performed in accordance with the authentication method of either the first example or the second example described above. The control unit 670 generates history information related to the result when authentication is attempted. The information items of the history information generated by the control unit 670 may be similar to those described related to the history table 580 of the management DB 530 of the management server 500. For example, in the present embodiment, since the lock target 10 is movable, it is advantageous to include the current position of the tag reader 600 measured (or estimated) by the positioning unit 660 at the point in time when the lock target 10 is unlocked or locked in the history information.

The control unit 670 may causes the reading and writing unit 610 to write the history information in the RFID tag 25 regardless of whether authentication is successful or a failure. Alternatively, the control unit 670 may cause the reading and writing unit 610 to write the history information in the RFID tag 25 only when authentication is successful. In this manner, the possibility of writing history information in an inappropriate RFID tag can be reduced.

In a case where authentication is successful, the control unit 670 transmits a switch command for switching the state of the lock target 10 to the switching apparatus 60 via the lock I/F 390. Here, the transmitted switch command may be an unlock command for unlocking the lock target 10. After the lock target 10 is unlocked and until the scheduled utilization term has ended or the RFID tag 25 stops being detected for a predetermined duration, the control unit 670 may maintain the unlocked state of the lock target 10. When the term for maintaining the unlocked state ends, the control unit 670 transmits a lock command for locking the lock target 10 to the switching apparatus 60 via the lock I/F 390.

The control unit 670 further monitors the status of the lock target 10, the switching apparatus 60, and the tag reader 600 and retains the status information in the storage unit 350. For example, the control unit 670 may periodically determine whether the apparatuses are operating normally and may store the operation status information indicating the determination result (normal or abnormal and the type of abnormality in the case of being abnormal) in the storage unit 350. Also, the control unit 670 may periodically determine the remaining battery life of an apparatus which is battery-driven and may update the remaining battery life information. The control unit 670 causes the reading and writing unit 610 to write the status information in the RFID tag 25. Writing of the status information in the RFID tag 25 may also be performed regardless of the authentication result or may be performed only in a case where authentication is successful. The information items of the status information written in the RFID tag 25 may be similar to those described related to the status table 590 of the management DB 530 of the management server 500.

(4) Switching Apparatus

As illustrated in FIG. 17, the switching apparatus 60 includes the actuator 51, sensors 63, the battery 55, and a controller 67. Note that only the differences in the configuration of the switching apparatus 60 from the switching apparatus 50 according to the first embodiment will be described here.

The sensors 63 include a sensor for detecting the state of the lock target 10 and a sensor for detecting the status of the switching apparatus 60 such as the operation status and the remaining battery life.

The controller 67 is a control circuit that controls the operations of the switching apparatus 60. For example, when the controller 67 receives an unlock command from the tag reader 600 when the lock target 10 is in the locked state, the controller 67 drives the actuator 51 to unlock the lock target 10. Also, when the controller 67 receives a lock command from the tag reader 600 when the lock target 10 is in the unlocked state, the controller 67 drives the actuator 51 to lock the lock target 10. The controller 67 sends back a response indicating the result of execution of the switch command to the tag reader 600.

Also, in response to a status inquiry from the tag reader 600 or periodically, the controller 67 notifies the tag reader 600 of the status of the lock target 10 and the switching apparatus 60 detected by the sensors 63. At least a part of the status information described above may be generated based on the status notified in this manner.

2-3. Processing Flow

In the present section, examples of processing flows that may be executed by the apparatuses constituting the lock management system 2 according to the present embodiment will be described using the flowcharts of FIGS. 18 and 19.

2-3-1. Authentication Processing

Figure 18:
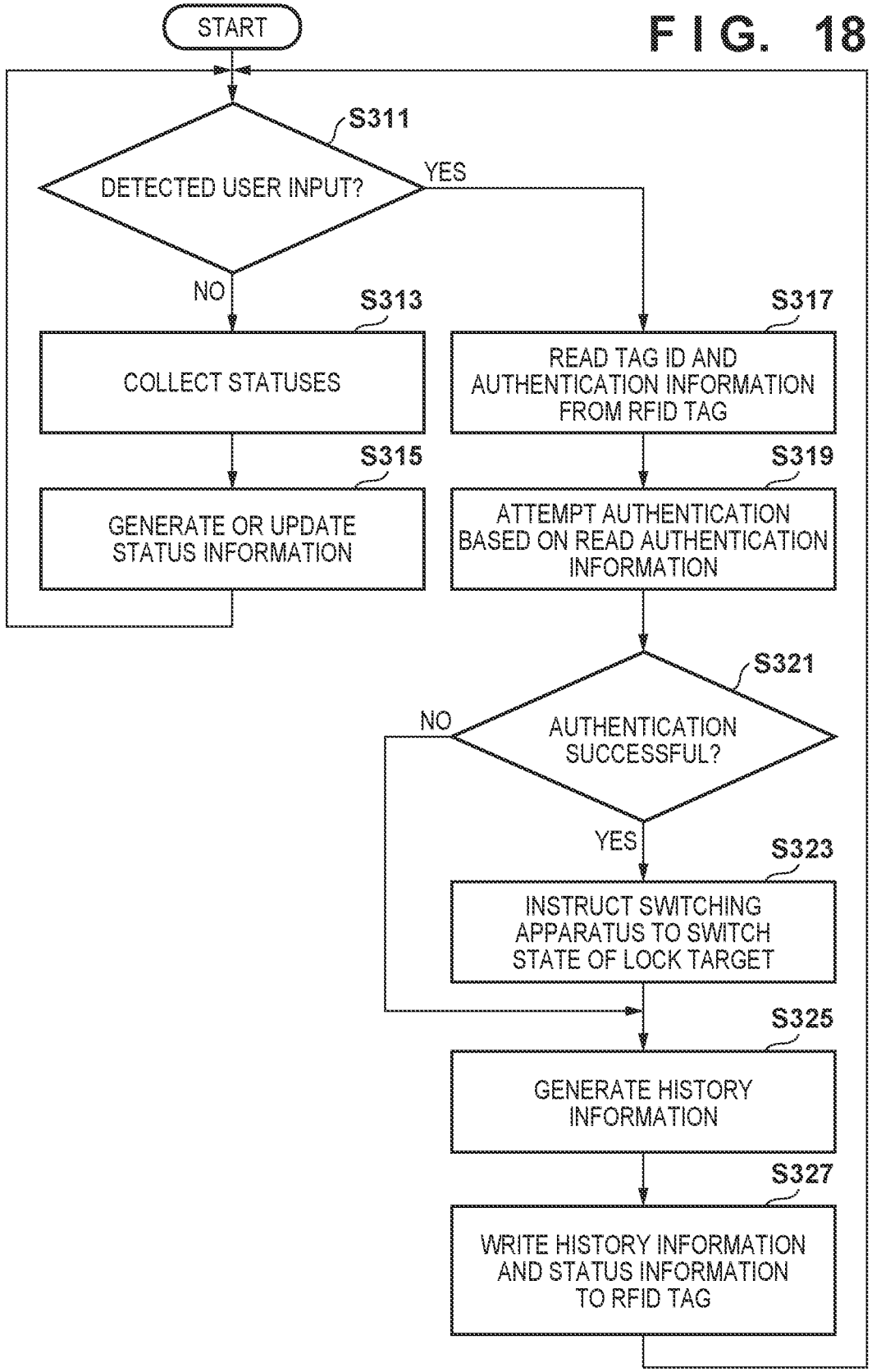
FIG. 18 is a flowchart illustrating an example of a flow of an authentication processing that can be executed by the tag reader.

FIG. 18 is a flowchart illustrating an example of the flow of the authentication processing that can be executed by the tag reader 600.

First, in S311, the input detection unit 330 continuously monitors for a user input. When a predetermined user input (for example, the press of the button 302) is not detected, the processing proceeds to S313. When a predetermined user input is detected, the processing proceeds to S317.

In S313, the control unit 670 collects statuses (for example, the operation status and the remaining battery life) of the lock target 10, the switching apparatus 60, and the tag reader 600. Next, in S315, the control unit 670 generates or updates the status information based on the statuses collected in S313. Then, the processing returns to S311.

In S317, the reading and writing unit 610 emits an electromagnetic wave within the tag reading range and reads the tag ID and authentication information sent back from the RFID tag 25. Next, in S319, the control unit 670 attempts authentication based on the read authentication information. Here, authentication may be performed based on a comparison between the authentication information and the authentication information for verification as described using FIG. 13 or may be performed based on a determination of the corresponding relationship between the utilization term indicated by the utilization term information and the term related to the current time as described using FIG. 14.

When the authentication attempted in S319 is successful (Yes in S321), in S323, the control unit 670 instructs the switching apparatus 50 to switch the state of the lock target 10 (for example, from the locked state to the unlocked state). When the authentication is a failure (No in S321), S323 is skipped, and the state of the lock target 10 is not changed.

Next, in S325, the control unit 670 generates history information related to the authentication result. At this time, the positioning unit 660 may measure the current position of the tag reader 600 and may include information indicating the measured position in the history information. Next, in S327, the reading and writing unit 610 writes the history information generated in S325 and the status information generated or updated in S315 in the RFID tag 25. Then, the processing returns to S311.

2-3-2. Information Collection Processing

Figure 19:
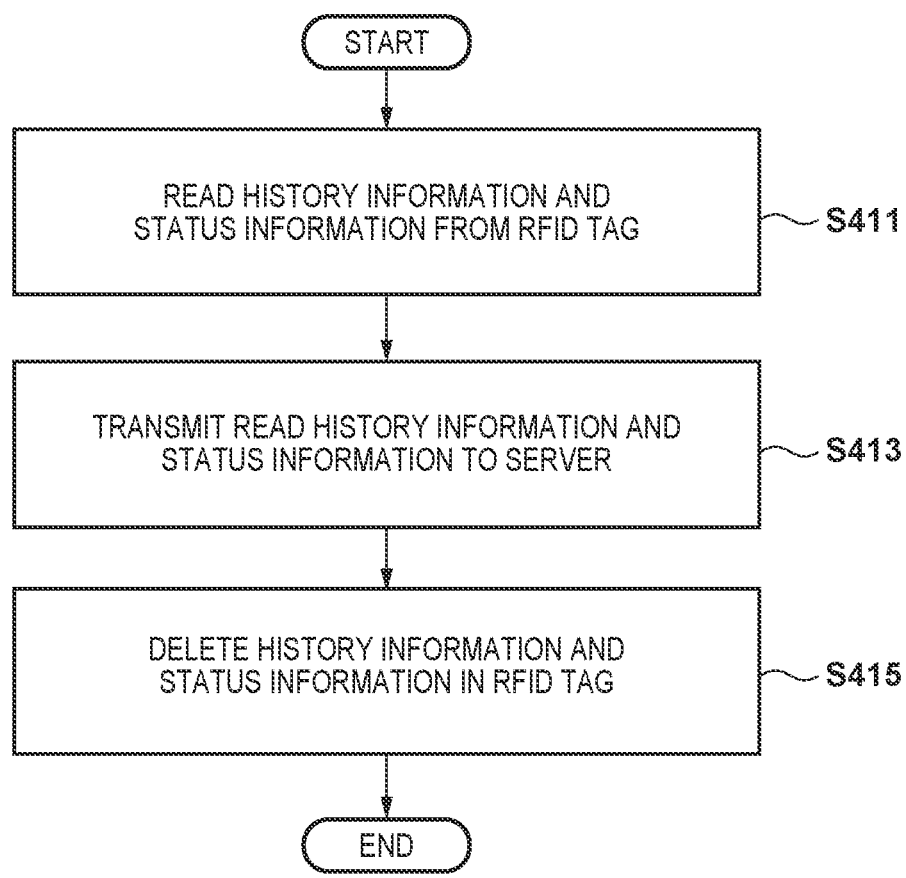
FIG. 19 is a flowchart illustrating an example of a flow of an information collection processing that can be executed by the reader/writer.

FIG. 19 is a flowchart illustrating an example of the flow of the information collection processing executed by the reader/writer 400. Note that the flow of the writing processing for writing the authentication information in the RFID tag 25 is similar to that described using FIGS. 8 to 10, and thus only the flow of the processing for information collection is illustrated in FIG. 19.

First, in S411, the reading and writing unit 410 reads the history information and the status information from the rewritable storage area of an RFID tag 25 within the tag reading range of the reader/writer 400.

Next, in S413, the control unit 470 transmits the history information and the status information read by the reading and writing unit 410 to the management server 500 via the communication I/F 140.

When transmission of information to the management server 500 is complete, in S415, the reading and writing unit 410, under control by the control unit 470, deletes the history information and the status information in the rewritable storage area of the RFID tag 25. Then, the information processing illustrated in FIG. 19 ends.

Note that, though the example in which the reader/writer 400 that writes the authentication information in an RFID tag 25 collects the history information and the status information from the RFID tag 25 has been described in the present section, the present embodiment is not limited to this example. That is, a tag reader that does not write authentication information in an RFID tag 25 may collect information from an RFID tag 25 and relay the information to the management server 200.

2-4. Alteration Example

Various alteration examples may be conceived related to how the information is collected from apparatuses that may be dispersed and located at multiple sites 15. Here, two alteration examples will be described.

2-4-1. First Alteration Example

Figure 20:
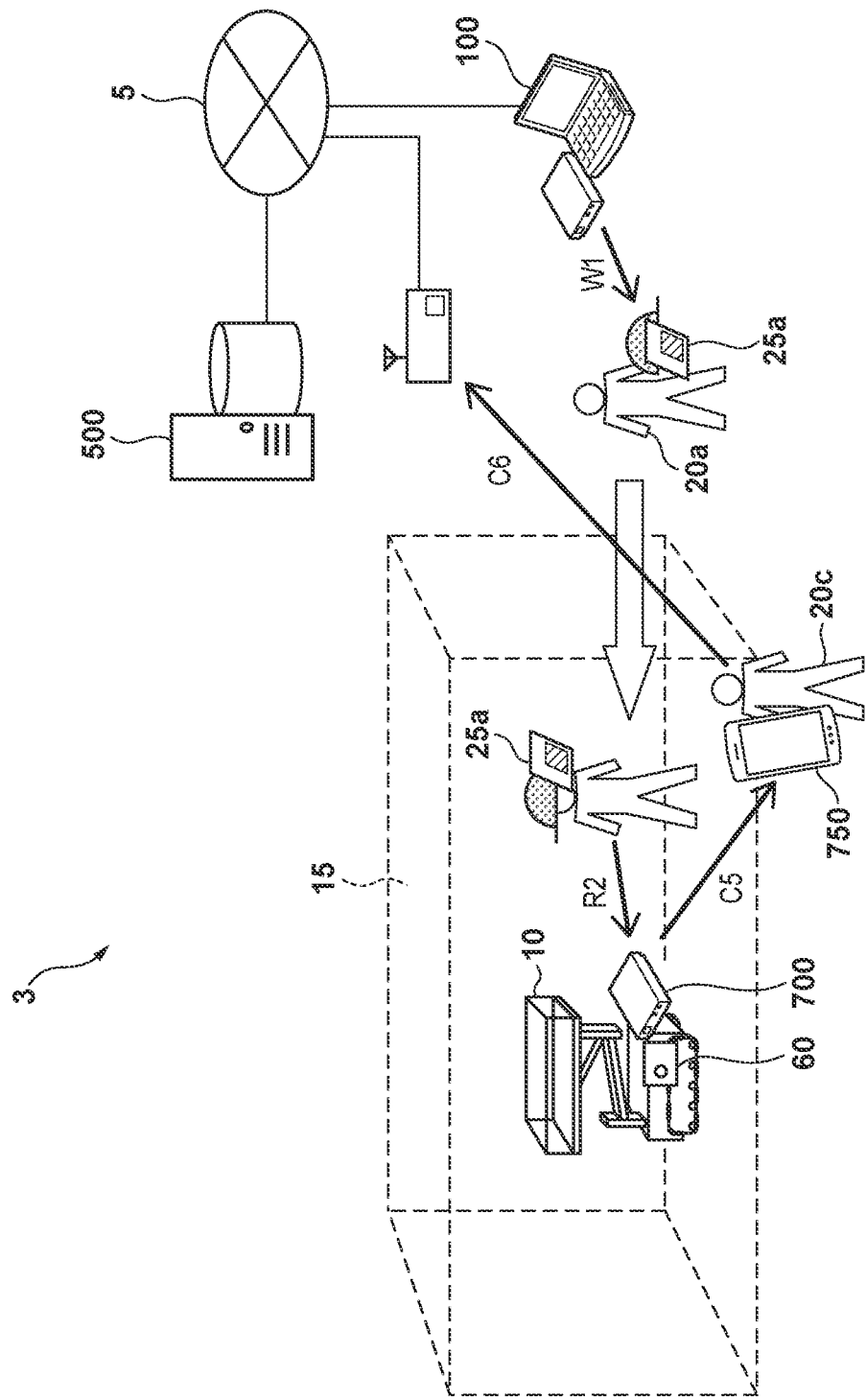
FIG. 20 is a schematic diagram illustrating an overview of a lock management system according to a first alteration example.

FIG. 20 is a schematic diagram illustrating an overview of a lock management system 3 according to the first alteration example. In the lock management system 3, instead of the tag reader 600 of the lock management system 2, a tag reader 700 is connected to the switching apparatus 60. In addition, writing of the authentication information in the RFID tag 25 may be performed by the reader/writer 100.

The tag reader 700 is a reading apparatus capable of reading information from RFID tags 25. As with the tag reader 600, the tag reader 700 generates history information related to switching of the state of the lock target 10 and status information for one or more of the lock target 10, the switching apparatus 60, and the tag reader 700. In the present alteration example, the tag reader 700 includes a short-range communication I/F and is capable of performing short-range communication with a communication terminal located nearby. When a communication link is established with a nearby communication terminal, the tag reader 700 transmits the history information and the status information accumulated in the internal memory to the communication terminal via the short-range communication I/F. Arrow C5 in FIG. 20 represents the transmission of information from the tag reader 700 to a communication terminal 750 in the possession of a user 20c. The communication terminal 750 that has received the history information and the status information uses an arbitrary communication path (for example, arrow C6 in the diagram via a wireless LAN access point) to upload the history information and the status information to the management server 500. The management server 500 stores the received history information and the status information in the history table 580 and the status table 590, respectively.

In the example illustrated in FIG. 20, the communication terminal 750 that relays the information between the tag reader 700 and the management server 500 is carried by the user 20c. However, the user 20a utilizing the lock target 10 may carry the communication terminal 750. The communication terminal 750 may be any type of terminal apparatus, such as a smartphone, a tablet PC, or a dedicated terminal for information relay, for example. The communication terminal 750 may be installed in a mechanical device, such as a vehicle (for example, an unmanned transport vehicle), a drone, or a robot, instead of being carried by a user. The communication link between the tag reader 700 and the communication terminal 750, for example, may be based on any type of communication method, such as Bluetooth (registered trademark), Wi-Fi Direct (registered trademark), or wireless USB, for example.

According to this alteration example, the management server 500 can collect the history information and the status information from apparatuses under the management of the system even when no user 20 is utilizing the lock target 10.

2-4-2. Second Alteration Example

Figure 21:
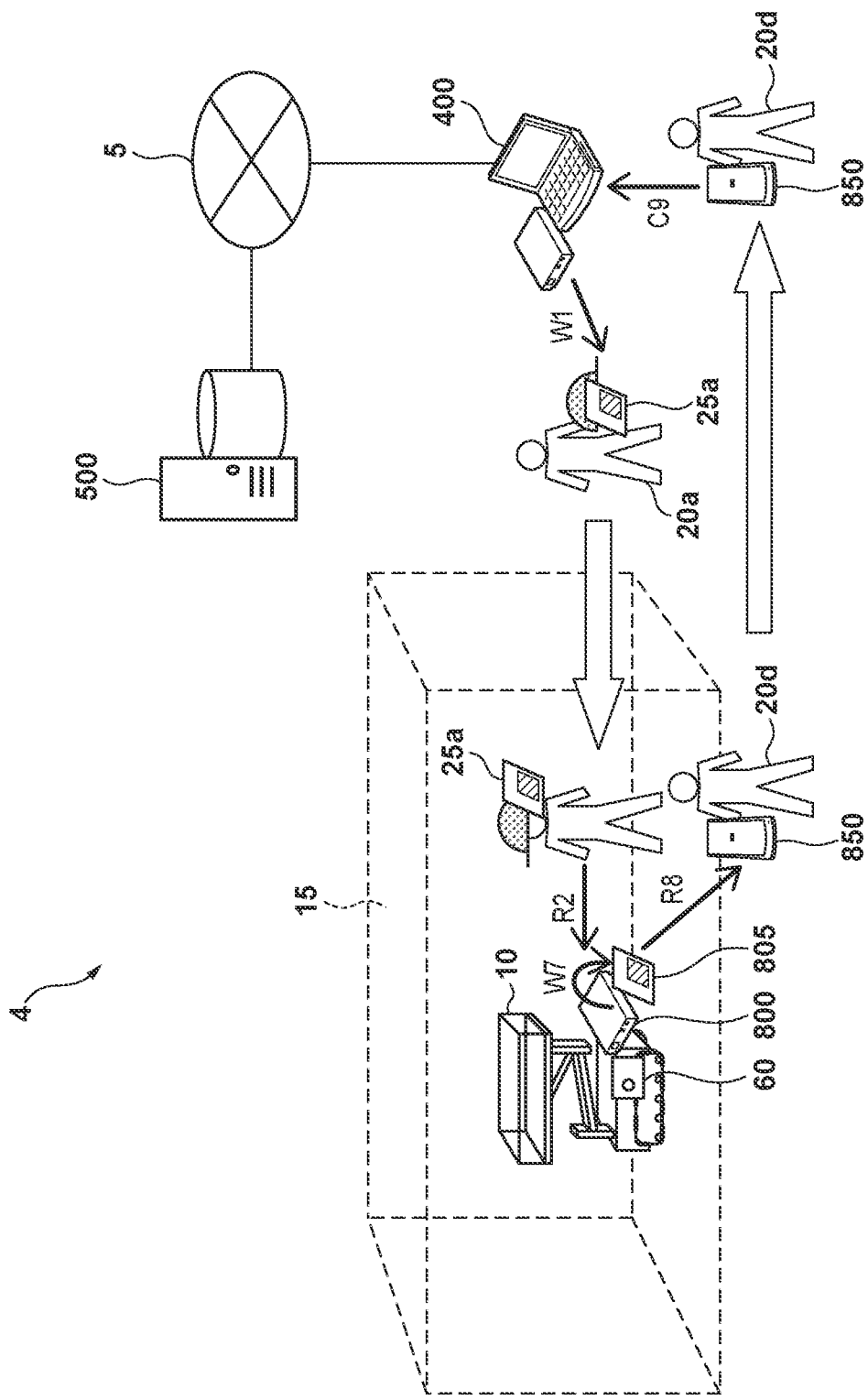
FIG. 21 is a schematic diagram illustrating an overview of a lock management system according to a second alteration example.

FIG. 21 is a schematic diagram illustrating an overview of a lock management system 4 according to the second alteration example. In the lock management system 4, instead of the tag reader 600 of the lock management system 2, a tag reader 800 is connected to the switching apparatus 60. In addition, an RFID tag 805 is fixed and installed inside or near the tag reader 800.

The tag reader 800 is a reading apparatus capable of reading information from RFID tags 25. As with the tag reader 600, the tag reader 800 generates history information related to switching of the state of the lock target 10 and status information for one or more of the lock target 10, the switching apparatus 60, and the tag reader 800. In the present alteration example, the tag reader 800 is further capable of writing information in the RFID tag 805 and writes the generated history information and the status information in the user area of the RFID tag 805. Arrow W7 in FIG. 21 represents the writing of information from the tag reader 800 in the RFID tag 805.

The lock management system 4 further includes a tag reader 850 for information collection that is capable of reading the history information and the status information from the RFID tag 805 in which the history information and the status information is written and transmit the read information to another apparatus. In the example in FIG. 21, when a user 20d carrying the tag reader 850 approaches the RFID tag 805, the tag reader 850 reads the history information and the status information from the RFID tag 805 (arrow R8 in the diagram). Thereafter, the user 20d returns to the location of the reader/writer 400 and connects the tag reader 850 to the reader/writer 400. Then, the reader/writer 400 receives the history information and the status information from the tag reader 850 (arrow C9 in the diagram) and relays the received information to the management server 500. The management server 500 stores the history information and the status information received from the reader/writer 400 in the history table 580 and the status table 590, respectively.

In the example illustrated in FIG. 21, the user 20d carries the tag reader 850. However, the tag reader 850 may be installed on a mechanical device, such as a vehicle, a drone, or a robot, instead of being carried by a user. The connection between the tag reader 850 and the reader/writer 400 may be based on any type of wired or wireless connection method. Moreover, the tag reader 850 may communicate with the management server 500 directly without connecting to the reader/writer 400.

According to this alteration example, by the user who visits the site 15 simply carrying the tag reader for information collection, the history information and the status information of the apparatuses in the site 15 can be collected.

3. CONCLUSION

Various embodiments and alteration examples related to the technology according to the present disclosure have been described using FIGS. 1 to 22. In the embodiments described above, authentication information is written by a writing apparatus capable of writing information in an RFID tag in a rewritable first storage area of a first RFID tag carried or worn by a user based on utilization schedule information related to a lock target. Then, a reading apparatus connected to a switching apparatus capable of switching the state of the lock target between a locked state and an unlocked state reads the authentication information from the first RFID tag, and authentication based on the read authentication information is attempted. In response to the authentication being successful, the reading apparatus instructs the switching apparatus to switch the state of the lock target. According to this configuration, it is possible to switch the state of the lock target (for example, unlock the lock target) so as to allow a user to utilize the lock target during a term indicated by a utilization schedule without requesting the user to perform a complicated operation. If a utilization schedule does not exist, as authentication information is not written in an RFID tag and authentication will not succeed, the state of the lock target is not switched. Accordingly, possibility of a lock target being utilized by a user at a timing which is not expected in a work plan is removed or minimized as much as possible.

In addition, in the embodiments described above, the authentication information written in the first storage area of the first RFID tag may be information generated based on utilization term information related to the term during which the lock target is utilized and authentication base information specific to the lock target. In this case, if the first RFID tag has authentication information for another lock target or temporally-invalid authentication information stored therein, authentication will fail. Thus, in a situation where there are different lock targets under management or different users can utilize the same lock target, it is possible to prevent a lock target from becoming open to an inappropriate user for utilization.

Moreover, in the embodiments described above, the reading apparatus is not required to communicate with an apparatus other than an RFID tag when performing authentication. Thus, in order to impose a time-based restriction on utilization of a lock target at a location where electromagnetic waves have trouble reaching, using the mechanism for lock management described above will be an effective solution.

In the second embodiment, the reading apparatus that performs the authentication described above generates history information related to switching of the state of the lock target and status information indicating statuses of the apparatuses, and the generated information is collected via an RF ID tag and tag reader or via a communication terminal. Thus, it is possible to efficiently collect information related to lock targets that may be utilized at various locations and to make use of the collected information for purposes including reviewing utilization records, investigating causes of abnormalities, and monitoring a remaining battery life.

According to the present invention, it is possible to impose a time-based restriction on utilization of a target without requesting a user to perform a complicated operation.

4. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A lock management system comprising:
a switching apparatus capable of switching a state of a lock target between a locked state and an unlocked state;
a first radio frequency identification (RFID) tag having a rewritable first storage area;
a writing apparatus capable of writing information in an RFID tag including the first RFID tag and configured to write authentication information in the first storage area of the first RFID tag based on utilization schedule information related to the lock target; and
a reading apparatus connected to the switching apparatus and capable of reading information from an RFID tag including the first RFID tag, wherein the reading apparatus is configured to read the authentication information sent back from the first RFID tag utilizing energy of an electromagnetic wave emitted by the reading apparatus, and to cause the switching apparatus to switch a state of the lock target in a case where authentication based on the read authentication information is successful,
wherein the utilization schedule information is registered in a database in association with tag identification information that identifies an RFID tag including the first RFID tag carried or worn by a user who utilizes the lock target,
the first RFID tag further has a second storage area that stores first tag identification information identifying the first RFID tag,
the writing apparatus is capable of reading information from an RFID tag including the first RFID tag, and
the writing apparatus is configured to:
read the first tag identification information from the second storage area of the first RFID tag;
obtain, from the database, the utilization schedule information associated with the read first tag identification information; and
write the authentication information in the first storage area of the first RFID tag based on the obtained utilization schedule information.

2. The lock management system according to claim 1, wherein the utilization schedule information is registered in a database in association with user identification information that identifies a user who utilizes the lock target, and
the writing apparatus is configured to:
obtain, from the database, the utilization schedule information associated with first user identification information of a first user who has accessed the writing apparatus; and
write the authentication information in the first storage area of the first RFID tag based on the obtained utilization schedule information.

3. The lock management system according to claim 2, wherein the writing apparatus is configured to read the first user identification information from a second RFID tag carried by the first user.

4. The lock management system according to claim 2, wherein the writing apparatus is configured to receive the first user identification information via a user interface of the writing apparatus.

5. The lock management system according to claim 1, wherein the utilization schedule information includes utilization term information related to a term during which the lock target is utilized, and
the authentication information is generated based on the utilization term information and authentication base information that is specific to the lock target, and is written in the first storage area of the first RFID tag by the writing apparatus.

6. The lock management system according to claim 5, wherein the reading apparatus is configured to:
prestore the authentication base information that is specific to the lock target; and
determine that the authentication is successful in a case where the authentication information read from the first RFID tag matches authentication information for verification generated based on term information related to a current time and the authentication base information.

7. The lock management system according to claim 5, wherein the authentication information is generated by encoding a bit sequence based on the utilization term information and the authentication base information in accordance with a predetermined encoding scheme.

8. The lock management system according to claim 1, wherein the utilization schedule information includes utilization term information related to a term during which the lock target is utilized, and
the authentication information is generated by encrypting the utilization term information with a first encryption key, and is written in the first storage area of the first RFID tag by the writing apparatus.

9. The lock management system according to claim 8, wherein the reading apparatus is configured to:
prestore a second encryption key corresponding to the first encryption key, and
determine that the authentication is successful in a case where the utilization term information recovered by decrypting the authentication information read from the first RFID tag with the second encryption key corresponds to a term related to a current time.

10. The lock management system according to claim 1, wherein the reading apparatus is configured to cause the switching apparatus to switch a state of the lock target in response to the successful authentication based on the authentication information read from the first RFID tag only in a case where a predetermined user input is detected.

11. The lock management system according to claim 1, wherein the reading apparatus is capable of writing information in an RFID tag including the first RFID tag, and
the reading apparatus is configured to:
generate history information related to switching of a state of the lock target; and
write the generated history information in an RFID tag including the first RFID tag.

12. The lock management system according to claim 11, wherein the reading apparatus is configured to write the history information in the first RFID tag in a case where the authentication based on the authentication information read from the first RFID tag is successful.

13. The lock management system according to claim 11, wherein the lock management system further includes a third RFID tag installed near the reading apparatus, and the reading apparatus is configured to write the history information in the third RFID tag.

14. The lock management system according to claim 12, wherein the lock management system includes a reading apparatus for collecting information configured to read the history information from an RFID tag including the first RFID tag in which the history information has been written, and to transmit the read history information to another apparatus.

15. The lock management system according to claim 1, wherein the reading apparatus is capable of performing short-range communication with a nearby communication terminal, and the reading apparatus is configured to:
  generate history information related to switching of a state of the lock target; and
  transmit the generated history information to the communication terminal.

16. The lock management system according to claim 15, wherein the history information includes one or more of:
  a time when authentication has been attempted;
  success or failure of authentication;
  information regarding an RFID tag including the first RFID tag from which authentication information is read;
  information regarding a user who carries or wears an RFID tag including the first RFID tag from which authentication information is read;
  information regarding the lock target; and
  whether the lock target has been unlocked or locked.

17. The lock management system according to claim 15, wherein the switching apparatus and the reading apparatus is capable of moving together with the lock target, the reading apparatus is configured to measure a position of the reading apparatus at a point in time when the lock target is unlocked or locked, and the history information includes position information indicating a position measured by the reading apparatus.

18. The lock management system according to claim 1, wherein the reading apparatus is configured to write, in an RFID tag including the first RFID tag, status information indicating a status of one or more of the lock target, the switching apparatus and the reading apparatus, and the lock management system includes a reading apparatus for collecting information configured to read the status information from an RFID tag including the first RFID tag in which the status information has been written, and to transmit the read status information to another apparatus.

19. The lock management system according to claim 18, wherein the status information includes information related to one or more of:
  abnormality of an apparatus; and
  remaining battery life in a case of an apparatus being battery-driven.

20. The lock management system according to claim 1, wherein the switching apparatus is an electronic lock,
  the lock target is an item or a space, and
  unlocking the lock target includes opening the electronic lock to allow the lock target to be utilized.

21. The lock management system according to claim 1, wherein the switching apparatus is equipment having a specific function,
  the lock target is the specific function to the equipment, and
  unlocking the lock target includes allowing the function to be activated.

* * * * *